United States Patent
Barber

(10) Patent No.: US 8,028,315 B1
(45) Date of Patent: Sep. 27, 2011

(54) SYSTEMS AND METHODS FOR USING AN INTERACTIVE TELEVISION PROGRAM GUIDE TO ACCESS FANTASY SPORTS CONTESTS

(75) Inventor: David Barber, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 1724 days.

(21) Appl. No.: 10/234,727

(22) Filed: Aug. 30, 2002

(51) Int. Cl.
*H04N 5/445* (2011.01)

(52) U.S. Cl. ............... 725/47; 725/40; 725/51; 725/61; 463/42

(58) Field of Classification Search .............. 725/40, 725/47, 51, 61; 463/42
See application file for complete search history.

(56) References Cited

U.S. PATENT DOCUMENTS

| | | | |
|---|---|---|---|
| 4,918,603 A | 4/1990 | Hughes et al. | 364/410 |
| 5,018,736 A | 5/1991 | Pearson et al. | 273/439 |
| 5,263,723 A | 11/1993 | Pearson et al. | 273/439 |
| 5,589,892 A * | 12/1996 | Knee et al. | 725/43 |
| 5,846,132 A * | 12/1998 | Junkin | 463/42 |
| 5,860,862 A | 1/1999 | Junkin | 463/40 |
| 5,971,854 A | 10/1999 | Pearson et al. | 463/41 |
| 6,193,610 B1 * | 2/2001 | Junkin | 463/40 |
| 6,536,041 B1 * | 3/2003 | Knudson et al. | 725/39 |
| 6,837,789 B2 | 1/2005 | Garahi et al. | |
| 6,837,791 B1 | 1/2005 | McNutt et al. | |
| 7,001,279 B1 | 2/2006 | Barber et al. | |
| 2001/0036853 A1 | 11/2001 | Thomas | |
| 2002/0034980 A1 * | 3/2002 | Lemmons et al. | 463/40 |
| 2002/0100046 A1 * | 7/2002 | Dudkiewicz | 725/46 |
| 2002/0124252 A1 * | 9/2002 | Schaefer et al. | 725/33 |
| 2002/0157099 A1 * | 10/2002 | Schrader et al. | 725/51 |
| 2002/0157101 A1 * | 10/2002 | Schrader et al. | 725/64 |
| 2002/0166123 A1 * | 11/2002 | Schrader et al. | 725/58 |
| 2004/0073437 A1 * | 4/2004 | Halgas et al. | 705/1 |
| 2004/0117831 A1 * | 6/2004 | Ellis et al. | 725/53 |

FOREIGN PATENT DOCUMENTS

| | | |
|---|---|---|
| WO | WO 01/33482 | 5/2001 |
| WO | WO 03/015403 | 2/2003 |

OTHER PUBLICATIONS

Cliff Charpentier, "1984 Fantasy Football Digest," Fantasy Sports Inc., Jun. 1984.
Jim Donaldson, "The Official Fantasy Football League Manual," Contemporary Books, Inc., 1985.
Cliff Charpentier, "1985 Fantasy Football Digest," Lerner Publications Company, 1985.
"All Pro Yearbook 1987: The Fantasy Football Magazine," All Pro Publishing Company, 1987.

(Continued)

*Primary Examiner* — Pankaj Kumar
*Assistant Examiner* — Timothy Newlin
(74) *Attorney, Agent, or Firm* — Ropes & Gray LLP

(57) ABSTRACT

Systems and methods for using an interactive television program guide application to access fantasy sports contests are presented. In some embodiments of the present invention, the interactive television program guide application may display information indicating to a user that one or more programs is related to a fantasy sports contest. In some embodiments of the present invention, the application may provide to the user a schedule of programs related to one or more fantasy sports contests in which the user participates. The application may provide additional features to fantasy sports contestants including automatic recording of programs related to a user's fantasy sports contest, playback of highlight video clips for events that affect a user's fantasy sports contest standing, and targeted advertisements for fantasy sports contests.

116 Claims, 32 Drawing Sheets

OTHER PUBLICATIONS

BBC Sport, *Fantasy Football Monthly, The Game* <http://bbcfootball.fantasyleague.co.uk/ et al.> (accessed Sep. 17, 2002).

CNN Sports Illustrated, *Fantasy Football Challenge* <http://footballl2201.si.cnn.com/ et al.> (accessed Sep. 23, 2002).

CNN Sports Illustrated, *Fantasy Golf Challenge* <http://gold5.si.cnn.com/ et al.> (accessed Sep. 23, 2002).

CNN Sports Illustrated, *Fantasy Nascar Challenge* >http://racing20.si.cnn.com/ et al.> (accessed Sep. 23, 2002).

CBS SportsLine.com, *John B. Sample League* <http://cbs.sportsline.com/> ( accessed Nov. 24, 1999).

CBS SportsLine.com, *Fantasy Baseball* <http://baseball101.fantasy.sportsline.com/ et al.> (accessed Sep. 23-24, 2002).

CBS SportsLine.com, *Fantasy Football* <http://football2145.fantasy.sportsline.com et al.> (accessed Sep. 23-24, 2002).

CBS SportsLine.com, *Fantasy Golf* <http://golf1.fantasy.sportsline.com/ et al.> (accessed Sep. 23, 2002).

CBS SportsLine.com, *Fantasy Hockey* <http://hockey2102.fantasy.sportsline.com/ et al.> (accessed Sep. 23-24, 2002).

CBS SportsLine.com, *Fantasy Racing* <http://racing.fantasy.sportsline.com/ et al.> (accessed Sep. 23, 2002).

ESPN Internet Ventures, *ESPN Fantasy Games* <http://games.espn.go.com/cgi/home/request.dll?FRONTPAGE et al.> (accessed Sep. 16-18, 2002).

"Fantasy-Football," Franchise Football League.

"Strat-O-Matic Pro Football," Strat-O-Matic Game Co. Inc.

"2000 Fantasy Basketball, Help Topics," Fantasy Sports Properties, Inc.

"2000 Fantasy Football, Help Topics," Fantasy Sports Properties, Inc.

"2000 Fantasy Hockey, Help Topics," Fantasy Sports Properties, Inc.

"2001 Fantasy Baseball, Help Topics," Fantasy Sports Properties, Inc.

* cited by examiner

1700

VIDEO FOR
CURRENT PROGRAM
OR
PROGRAM GUIDE
APPLICATION SCREEN

1702

REMINDER
1602
Baltimore Game
on in 15 minutes
1704
Relevant Fantasy Player:
David Segui   DH
1706         1708  OK

VIDEO FOR
CURRENT PROGRAM
OR
PROGRAM GUIDE
APPLICATION SCREEN

1902

1904 — Fantasy Major League Baseball Contest

1906 — Your Score: 3,150 Pts.
1908 — Standing: 2nd Place

1910 — Yankees 5
Athletics 2 8th Inning

1912 — ▼ Remove

2500

| | | | 2510 | 2512 |
|---|---|---|---|---|
| NAME | LEAGUE | LOCATION | SCORE | RANK |
| John Smith | | Dallas, TX | 6,125 PTS | 1 |
| Mark Johnson | | Trenton, NJ | 5,875 PTS | 2 |
| <MY NAME> | <MY LEAGUE> | <MY LOCATION> | 3,250 PTS | ---- |

SERVICE PROVIDER LOGO    2502    10:30P    BRAND LOGO

FANTASY SPORTS MAJOR LEAGUE BASEBALL CONTEST

ACTIVATE FANTASY ROSTER SELECTIONS

| Position | Catcher ▼ |
|---|---|

2504

| Defense | Posada | NYY ▼ |
|---|---|---|
| Offense | Piazza | NYM ▼ |

2506

View List of Activated Fantasy Roster Selections

SYSTEMS AND METHODS FOR USING AN INTERACTIVE TELEVISION PROGRAM GUIDE TO ACCESS FANTASY SPORTS CONTESTS

BACKGROUND OF THE INVENTION

This invention relates to interactive television program guides, and more particularly, this invention relates to systems and methods for using an interactive television program guide application to access fantasy sports contests.

In known fantasy sports contests, a user (i.e., a fantasy sports contestant) selects a roster, a team, a particular individual, or a group of individuals in a season-long athletic competition. Fantasy sports contests are typically based on real-life team sports (e.g., football, baseball, basketball, hockey, soccer, rugby, etc.), real-life athletic events in which individuals compete (e.g., golf, tennis, automotive racing, etc.), and real-life sporting events involving animals (e.g., horse and dog racing). The user is given the ability to take on the role of a fictional general manager with powers which may include the ability to draft, trade, dismiss and otherwise manage the user's fantasy sports roster selections.

Known fantasy sports contest systems provide services to users which include providing statistical information for real-life athletic competition and tracking users' standings (i.e., rankings) in fantasy sports contests. Known fantasy sports contest systems typically determine a user's standing (i.e., ranking) in a fantasy sports contest based on the performance of the user's fantasy sports roster selections in real-life athletic competition. For example, a conventional fantasy sports contest system might award five fantasy sports contest points to the user for every goal scored in real-life by a member of the user's fantasy sports contest soccer team. Generally, the user who has accumulated the most fantasy sports contest points by the conclusion of a fantasy sports contest (e.g., the end of a real-life athletic season) is the overall winner of that fantasy sports contest.

Fantasy sports contestants typically track closely real-life athletic events. In particular, because fantasy sports contests are traditionally intimately tied to real-life athletic competition, a user's performance in a contest often hinges on the user's ability to, for example, plan favorable trades and otherwise knowledgeably control the user's fantasy sports team. A fantasy sports contestant traditionally consults with any number of sources including newspapers, sports journals, digests, and television in attempts to maximize the user's personal body of knowledge regarding the user's fantasy sports contest.

Known interactive television program guide systems contribute little to fantasy sports contestants and fantasy sports competition. In particular, despite steady growth in the field of interactive television program guides, known systems have failed to address the issues and concerns of fantasy sports contestants.

In view of the foregoing, it would be desirable to provide systems and methods for using an interactive television program guide application to access fantasy sports contests.

SUMMARY OF THE INVENTION

It is an object of the present invention to provide systems and methods for using an interactive television program guide application to access fantasy sports contests.

This and other objects are accomplished in accordance with the present invention by providing an interactive television program guide application that provides fantasy sports contest information to a user.

Systems and methods for using an interactive television program guide application to provide fantasy sports contest information to a user are provided. In some embodiments of the present invention, the interactive television program guide application may determine that a program is related to a fantasy sports contest. For example, the application may determine that a program relates to a real-life competition or one or more real-life sports players that affect a fantasy sports contest using data received from any suitable source. The application may display to the user any suitable information to indicate to the user that the program is related to the fantasy sports contest such as an indicator in a program listings display screen or other suitable information (e.g., information for one or more real-life sports players to which the program relates, etc.). In embodiments in which the user participates in the fantasy sports contest to which the program relates, the interactive television program guide application may display to the user information that indicates the user's performance (e.g., the user's fantasy sports contest point total) in response to, for example, a user indication of the program listing.

In some embodiments of the present invention, the interactive television program guide application may provide to the user an opportunity to view a schedule of programs that are related to one or more fantasy sports contests in which the user participates. Such schedules may include, for example, any suitable information such as title, channel, names of real-life athletes that affect fantasy sports competition, or any other suitable information.

In some embodiments of the present invention, the interactive television program guide application may schedule fantasy sports-related programs for automatic recording for the user. The application may determine that a program is related to a fantasy sports contest in which the user participates (e.g., a fantasy sports contest for which the user has fictitiously selected one or more real-life sports players to the user's fantasy team roster). The application may then, for example, schedule the program for automatic recording without further process, or may consider factors such as a number of the user's fantasy players to which the program relates, the program's position in a user-define record priority (e.g., which may indicate, for example, that programs for the user's fantasy baseball contest are recorded with higher priority than programs of the user's fantasy basketball contest), or based on any other suitable criteria or combination thereof.

In some embodiments of the present invention, the interactive television program guide application may display to the user information for events that occur in programs related to a fantasy sports contest in which the user participates. An event may correspond to, for example, an accumulation of a statistic by a real-life player that has been fictitiously drafted to the user's fantasy team roster. For example, the application may display to a user a number of fantasy sports contest points that the user receives as a result of the event. In some embodiments of the present invention, the application may, for example, record the event using a suitable recording device such as a personal video recorder (PVR). The interactive television program guide may provide to the user highlight video clips of the events when, for example, playing back a prerecorded data from the PVR.

In some embodiments of the present invention, the interactive television program guide application may display fantasy sports information simultaneously with video for a selected program (e.g., a program with which the fantasy sports information is associated). The application may provide to a user the ability to select a program for viewing. In response to determining that the program relates to a fantasy sports contest in which the user participates, the application may simultaneously display the video and its corresponding fantasy sports information (e.g., the fantasy score of the user that is affected by events associated with the program).

In some embodiments of the present invention, the interactive television program guide may display fantasy sports contest data according to a user's location in, for example, the program guide. In response to a user navigating to a portion of a program guide that includes a program related to a fantasy sports contest, the application may display an advertisement targeted to that fantasy sports contest. The application may also target ads for fantasy sports contests based on a maintained viewing history for the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 16-18 are illustrative interactive television program guide application reminder display screens in accordance with various embodiments of the present invention;

FIG. 25 is an illustrative interactive television program guide application activate fantasy sports contest roster selections display screen in accordance with one embodiment of the present invention;

DETAILED DESCRIPTION OF THE INVENTION

Figure 1:
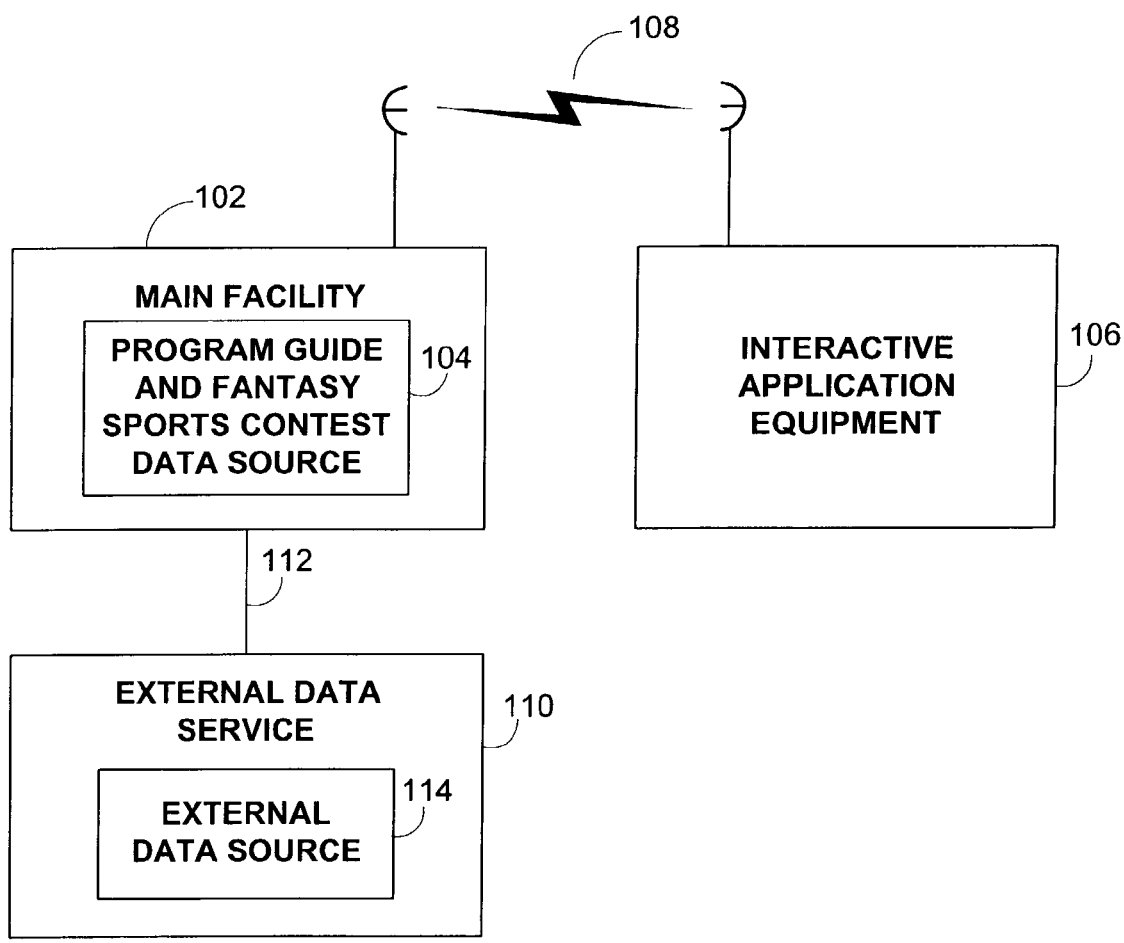
FIG. 1 is an illustrative arrangement for an interactive program guide application system that provides access to information for fantasy sports contests in accordance with one embodiment of the present invention.

Systems and methods for using an interactive television program guide to access fantasy sports contests are presented.

Illustrative interactive television program guides are described, for example, in Knee et al. U.S. Pat. No. 5,589,892, Knudson et al. U.S. patent application Ser. No. 09/070,555, filed Apr. 30, 1998, and Knudson et al. U.S. patent application Ser. No. 09/357,941, filed Jul. 16, 1999, which are hereby incorporated by reference herein in their entireties.

Illustrative fantasy sports contests are described, for example, in U.S. Pat. Nos. 4,918,603 (Hughes, et al.), 5,846, 132 (Junkin), 5,971,854 (Junkin) and 6,193,610 (Junkin), as well as Hughes et al. U.S. patent application Ser. No. 09/428, 991, filed Oct. 29, 1999, Hughes et al. U.S. Provisional Patent Application No. 60/329,587, filed Oct. 15, 2001, and Hughes U.S. Provisional Patent Application No. 60/338,916, filed Nov. 5, 2001, which are all hereby incorporated by reference herein in their entireties.

Fantasy sports contests of the present invention may include any suitable sports contest in which the user is given the ability to make decisions that may affect the standing of the user in the sports contest. For example, in typical team-oriented fantasy sports contests, the user may participate in the capacity of a fictional general manager. In this situation, the user may be have responsibilities such as creating a team roster (e.g., drafting players), selecting player positions, selecting starters, selecting relievers, making trades, and otherwise maintaining the composition of the user's team roster. It will be understood that any other suitable decision-making capability may be given to the user in a fantasy sports contest in addition to or in place of those indicated above.

Fantasy sports contests of the present invention need not be limited or restricted in time. For example, a fantasy sports contest may last an entire season, a portion of a season, multiple seasons, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests of the present invention may include contests in which the user is not necessarily playing the role of a fictional general manager. For example, fantasy sports contests may involve the user determining or guessing (i.e., blindly or with calculation) whether particular outcomes will occur (e.g., whether a particular golfer will make the next putt). Any such suitable decision-making may be the basis of a fantasy sports contest or a part of a fantasy sports contest.

Fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), and head-to-head systems (e.g., users in a league are matched against one another in a round-robin series of one-on-one contests during the course of a season). These are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The present invention is primarily described herein in terms of an interactive television program guide application. The interactive television program guide application may be any suitable software, hardware, or both that may be used to implement the features of present invention. It will be understood that any other suitable software, hardware, or both (e.g., a fantasy sports contest application) may be used in conjunction with the interactive television program guide application or in place of the interactive television program guide application to implement some or all of the features of the present invention.

FIG. 1 shows an illustrative system 100 for providing interactive television program guides and fantasy sports contests in accordance with one embodiment of the present invention. Main facility 102 may provide program guide data and fantasy sports contest data from program guide and fantasy sports contest data source 104 to interactive application equipment 106 via communications path 108. There may be numerous installations of interactive application equipment 106, although only one is shown in FIG. 1 to avoid overcomplicating the drawing. Program guide and fantasy sports contest data source 104 of main facility 102 may be any suitable computer or computer-based system for generating, storing, or obtaining program guide data (e.g., manually from an operator, electronically via a computer network or other connection, or via storage media) and putting the data into electronic form for distribution by main facility 102. In the example of FIG. 1, program guide and fantasy sports contest data source 104 provides both program guide data and fantasy sports contest data. In other embodiments of the present invention, program guide data and fantasy sports contest data may be provided by separate data sources.

Program guide data may include, for example, titles, channels, and times of scheduled programs, descriptions of scheduled programs, pay-per-view program data, on-demand media data, and any other data for the interactive television program guide (e.g., data indicating a list of programs scheduled for automatic recording or reminding, a list of programs that are related to a fantasy sports contest in which the user participates, advertisements, etc.).

Fantasy sports contest data may include, for example, rules data, statistics data, contest data, and any other data for one or more fantasy sports contests and fantasy sports contestants. For example, fantasy sports contest data may include rules data that governs user participation in fantasy sports contests (e.g., data indicating a maximum number of fantasy sports contests that a user may participate in, a maximum number of fantasy sports contest trades that may be made in a week or other duration of time, whether a user is permitted to participate in fantasy sports contests that award cash or non-cash prizes, other fantasy sports contest options, etc.). As another example, fantasy sports contest data may include statistics data for real-life athletic events and athletes (e.g., data indicating real-life sports scores and other outcomes of real-life athletic events, trades of real-life athletes, real-life athletes that are disabled or ineligible due to injury or expulsion, a real-life athlete's statistics for an athletic season, portion of an athletic season, or multiple athletic seasons, etc.). The real-life statistics data may be used to, for example, determine various fantasy sports contest options and settings (e.g., the fantasy players available for roster selection, the salaries of fantasy sports roster selections, a fantasy sports contestant's fantasy point total, etc.). Fantasy sports contest data may also include contest data that indicates, for example, a list of fantasy sports contestants of a particular fantasy sports contest league, fantasy sports contest standings, a list of roster selections (e.g., sports players) of a particular fantasy sports contestant, or any other data specific to one or more fantasy sports contests or fantasy sports contestants.

The above description of program guide data and fantasy sports contest data is merely illustrative. Program guide and fantasy sports contest data of the present invention may include any suitable data that is used by the interactive television program guide to provide to the user the ability to access one or more of fantasy sports contests and the interactive television program guide. It will be understood that, in some instances, the distinction between program guide data and fantasy sports contest data may be in name only (e.g., in instances in which the same data may be used to, for example, determine the list of real-life players that have been fictitiously selected to the user's fantasy team roster and to determine which programs are related to a fantasy sports contest of the user).

In some embodiments of the present invention, data sources may be located at facilities separate from main facility 102. For example, external data service 110 may provide data to main facility 102 via communications path 112 for distribution. External data service 110 may be any facility suitable for providing data for the interactive television program guide application to main facility 102 over communications path 112. External data service 110 may provide, for example, fantasy sports contest data (e.g., contest data that indicates a list of athletic players that are available for selection by a user). As another example, external data service may provide advertisement data (e.g., data for advertisements that are targeted to current or potential fantasy sports contestants). Still another example, external data service may provide statistics data (e.g., statistics data for real-life athletic events and athletes), news data (e.g., for sports events related to a fantasy sports contest in which the user participates), or any other data for the interactive television program guide application. External data service 110 may be, for example, a television network or cable system headend. In some embodiments of the present invention, external data service 110 may provide data relevant to a particular locality, such as a local newspaper that distributes local news such as local sports scores or a weather station that reports local weather data.

External data service 110 may contain external data source 114. External data source 114 may be any suitable computer or computer-based system for generating, storing, or obtaining data for the interactive television program guide application (e.g., manually from an operator, electronically via a computer network or other connection, or via storage media) and putting the data into electronic form for distribution to main facility 102 or other facility.

Multiple external data services 110 and multiple communications paths 112 may provide data to main facility 102. Only one external data service 110 and one communications path 112 have been shown in FIG. 1, however, to avoid overcomplicating the drawing. Main facility 102 may transmit data received from external data service 110 to interactive application equipment 106 over communications path 108. In some embodiments of the present invention, external data service 110 may provide data directly to interactive application equipment 106.

Communications paths 108 and 112 may be satellite communications paths, fiber-optic paths, coaxial cable paths, radio frequency paths, electromagnetic communications paths, microwave communications paths, Internet paths, or any other suitable wired or wireless communications path or combination of such paths. Communications paths 108 and 112 may have sufficient bandwidth to transmit video signals.

Main facility 102 may transmit program guide and fantasy sports contest data to interactive application equipment 106 using any suitable approach or combination of approaches. For example, main facility 102 may distribute program guide and fantasy sports contest data periodically, continuously, or using any other suitable approach. As another example, real-life sports scores and sports updates (e.g., a recap of the events for a particular sports game) may be transmitted to interactive application equipment 106 in a time-delayed fashion. In some embodiments of the present invention, certain portions of the program guide and fantasy sports contest data may be transmitted using a first approach, whereas certain other portions of the program guide and fantasy sports contest data may be transmitted using a second approach. For example, advertisements for programs related to a fantasy sports contest in which the user participates and sports scores for real-life athletic events related the fantasy sports contest may be transmitted to the user continuously (e.g., in real-time when the real-life athletic events are taking place), whereas program listings data and fantasy sports contest rules data may be transmitted to the user periodically. Program guide and fantasy sports contest data may be distributed discretely as separate files or packets, or may be distributed in a continuous data stream (e.g., using a carousel-based approach).

In some embodiments of the present invention, main facility 102 may transmit fantasy sports contest data separate from program guide data. Fantasy sports contest data and program guide data may be provided by main facility 102 using different approaches. For example, main facility 102 may provide certain portions of the fantasy sports contest data (e.g., real-life sports scores, data indicating a user's performance in a fantasy sports contest, etc.) in a continuous data stream (e.g., using a carousel-based approach) while providing program guide data (e.g., program listings) periodically or on-demand using a client-server based approach. Any suitable combination of approaches may be used.

In some embodiments of the present invention, main facility 102 may, for example, provide program guide and fantasy sports contest data to interactive application equipment 106 as part of schedule localizations. Examples of systems that utilize schedule localizations are described in Borges et al. U.S. Pat. No. 5,760,821, which is hereby incorporated by reference herein in its entirety. Periodic schedule localizations may update program listings, fantasy sports scores, real-life athletic scores, and other data for the interactive television program guide application with any suitable frequency (e.g., daily, weekly, continuously, etc.), allowing information from a central facility, such as main facility 102, to be received and processed at local facilities, such as those of interactive application equipment 106. Schedule localizations may be utilized to provide program guide and fantasy sports contest application data to interactive application equipment 106 when the frequency of schedule localization permits.

Main facility 102 may store reusable interactive application equipment lists. The lists may include identifiers of multiple installations of interactive application equipment 106 (e.g., cable headends, individual subscriber units, etc.) that occupy a common locality, region or coverage area, or that receive data for the same set of television channels (e.g., via satellite). The lists may also include identifiers of multiple installations of interactive application equipment 106 that receive data for the same one or more fantasy sports contests (e.g., each of the installations of interactive application equipment 106 providing the data to at least one member of the one or more fantasy sports contests).

Main facility 102 may use stored interactive application equipment lists to specify the scope of schedule localization transmissions. For example, main facility 102 may utilize an interactive application equipment list to localize program guide and fantasy sports contest data to the installations of interactive application equipment 106 specified by the list. In addition, main facility 102 may create new interactive application equipment lists in the event that no existing list satisfies the desired scope of a schedule localization transmission (e.g., when a new fantasy sports contest includes contestants whose corresponding interactive application equipment had not previously been grouped in the same list). Main facility 102 may also update existing interactive application equipment lists (e.g., to include a user that enters a fantasy sports contest mid-season, to identify that the list addresses contestants of a new fantasy sports contest league that had previously been contestants of another fantasy sports contest league, etc.). Main facility 102 may also delete interactive application equipment lists once they have become obsolete or are no longer needed (e.g., when a fantasy sports contest has concluded).

Figure 2:
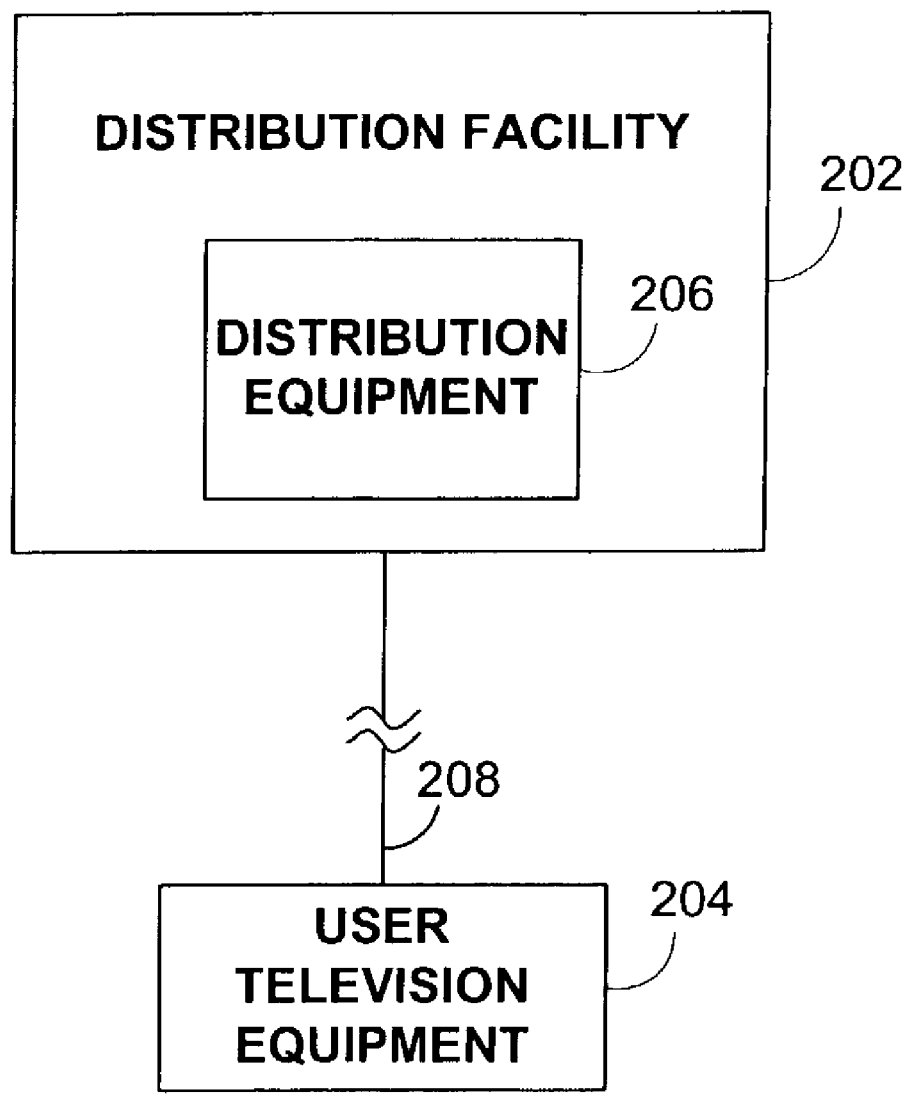
FIGS. 2-7 are illustrative arrangements of the interactive application equipment of FIG. 1 in accordance with various embodiments of the present invention.

An illustrative arrangement for interactive application equipment 106 is shown in FIG. 2. In FIG. 2, interactive application equipment 106 may include distribution facility 202. Distribution facility 202 may be any suitable distribution facility (e.g., a cable system headend, a satellite distribution facility, a broadcast distribution facility, or any other suitable type of distribution facility) capable of providing program guide and fantasy sports contest data to user television equipment 204. Interactive application equipment 106 may include multiple installations of distribution facilities 202 and multiple installations of user television equipment 204, but only one of each have been included in FIG. 2 to avoid overcomplicating the drawing.

Distribution facility 202 may receive program guide and fantasy sports contest data from main facility 102 (FIG. 1), from an external data service such as external data service 110 (FIG. 1), or from any other suitable facility or location. In some embodiments of the present invention, distribution facility 202 may generate one or more of program guide data and fantasy sports data. For example, a computer at distribution facility 204 may generate (or an operator at such a computer may input) program listings data for local programming or fantasy sports contest rules data for contestants in a particular locality.

Distribution facility 202 may include distribution equipment 206. Distribution equipment 206 may be any equipment suitable for distributing program guide data to user television equipment 204. Distribution equipment 206 may include, for example, suitable transmission hardware for distributing program guide data on a television channel sideband, in the vertical blanking interval of a television channel, using an in-band digital signal, using an out-of-band digital signal, or by any other suitable data transmission technique. Distribution equipment 206 may transmit analog or digital signals comprising programming guide data to user television equipment 204 on multiple television channels.

In some embodiments of the present invention, the interactive television program guide application may be at least partially implemented by distribution facility 202. For example, portions of the interactive television program guide application that implement features involved in the processing of user equipment requests and in the tracking of the performance of fantasy sports contestants may be implemented by distribution facility 202. In some embodiments of the present invention, the interactive television program guide application may be at least partially implemented by user television equipment 204. For example, portions of the interactive television program guide application that implement features involved in user interaction may be implemented by user television equipment 204. The two portions of the interactive television program guide application may communicate using any suitable peer-to-peer communications scheme (e.g., messaging, remote function calls, etc.) and may perform interactive application functions distributively between distribution facility 202 and user television equipment 204.

Distribution facility 202 may provide one or more of program guide data, fantasy sports contest data, video media, and television programming to user television equipment 204 over communications path 208. Communications path 208 may be a satellite communications path, a fiber-optic path, a coaxial cable path, a radio frequency path, an electromagnetic communications path, a microwave communications path, an Internet path, or any other suitable wired or wireless path or combination of such paths.

In some embodiments of the present invention, distribution facility 202 may periodically transmit one or more of program guide and fantasy sports contest data to user equipment 204. For example, program guide and fantasy sports contest data may be updated at user television equipment 204 daily, weekly, or with any other suitable frequency. In some embodiments of the present invention, distribution facility 202 may transmit program guide and fantasy sports contest data to user television equipment 204 in a real-time data stream. For example, fantasy sports contest data such as a sports score for a real-life athletic event related to a fantasy sports contest in which the user participates and data indicating a user's performance in the fantasy sports contest may be transmitted to user television equipment 204 in real time (i.e., while the event is in progress). As another example, one or more of program guide and fantasy sports contest data may be transmitted to user television equipment 204 in a time-delayed fashion (e.g., sports scores and other data delayed 30 minutes from real-time events).

In some embodiments of the present invention, distribution facility 202 may transmit program guide data to user television equipment 204 continuously in a carousel-based approach, in which portions of program guide and fantasy sports contest data (e.g., listings, pay-per-view data, fantasy sports contest standings, etc.) are continuously broadcasted in a time-division multiplexed fashion. In some embodiments of the present invention, main facility 102 (FIG. 1) may utilize a separate communications link (not shown) to transmit data directly to user equipment 204. In some embodiments of the present invention, distribution facility 202 or another facility or location may transmit one or more of program guide data and fantasy sports contest data to user television equipment 204 in a dedicated channel. Distribution facility 202 may, for example, transmit advertisements for programs related to a fantasy sports contest in which the user participates to user television equipment 204 in one or more dedicated channels. For example, distribution facility 202 may transmit a promotional video for a Major League Baseball team to user television equipment 204 in a dedicated channel if the corresponding user participates in a fantasy Major League Baseball contest (e.g., and one of the user's fantasy sports contest roster selections is a member of that Major League Baseball team). As another example, distribution facility 202 may transmit highlight video clips for sporting events related to a fantasy sports contest in which the user participates to user equipment 204 in a dedicated channel.

Figure 3:
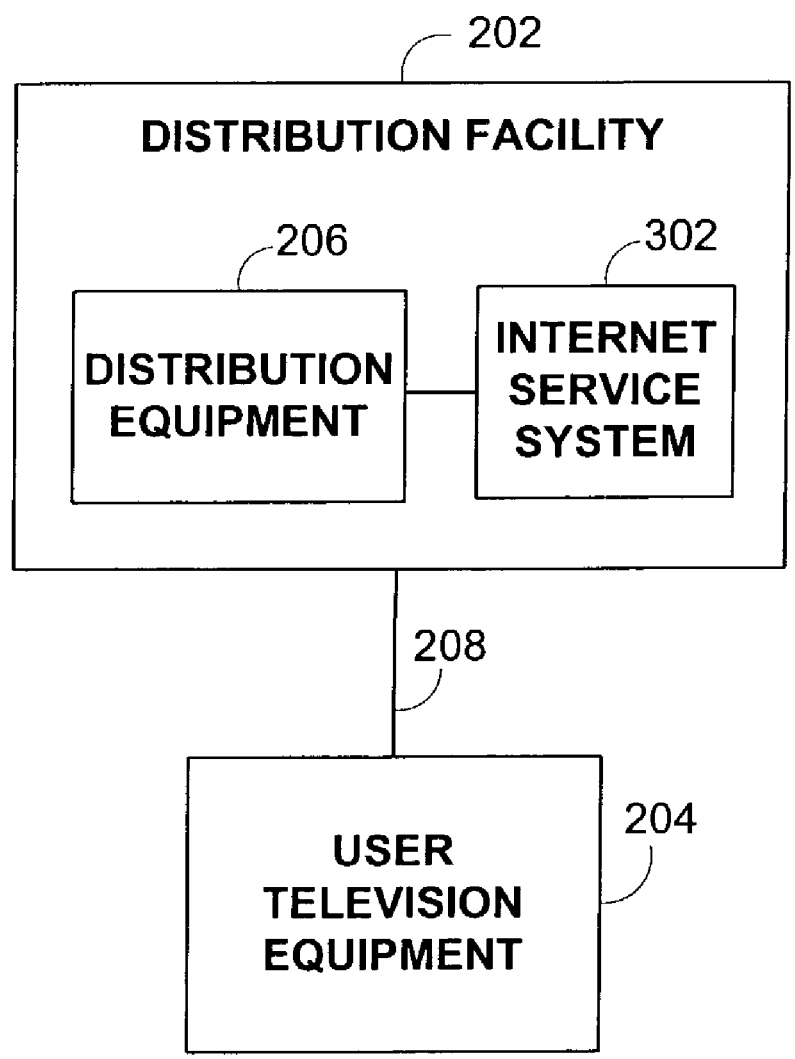

In some embodiments of the present invention, interactive application equipment 106 may obtain program guide and fantasy sports contest data from main facility 102 (FIG. 1), external data service 110 (FIG. 1), or any other suitable source of program guide and fantasy sports contest data via the Internet. An illustrative arrangement of interactive application equipment 106 (FIG. 1) for such an approach is shown in FIG. 3. Distribution equipment 206 may obtain one or more of program guide data and fantasy sports contest data from Internet service system 302. Internet service system 302 may be any combination of hardware and software suitable for providing the program guide and fantasy sports contest data to distribution equipment 206 from the Internet. For example, a sports team or service having access to data for that sports team may transmit real-life sports scores, statistics data, and news data (e.g., trade data, disabled or ineligible players data, etc.) to distribution facility 202 via the Internet. The interactive television program guide application may use such data to, for example, determine which players are available for trading by a fantasy sports contestant and to determine fantasy sports contest rankings.

Figure 4:
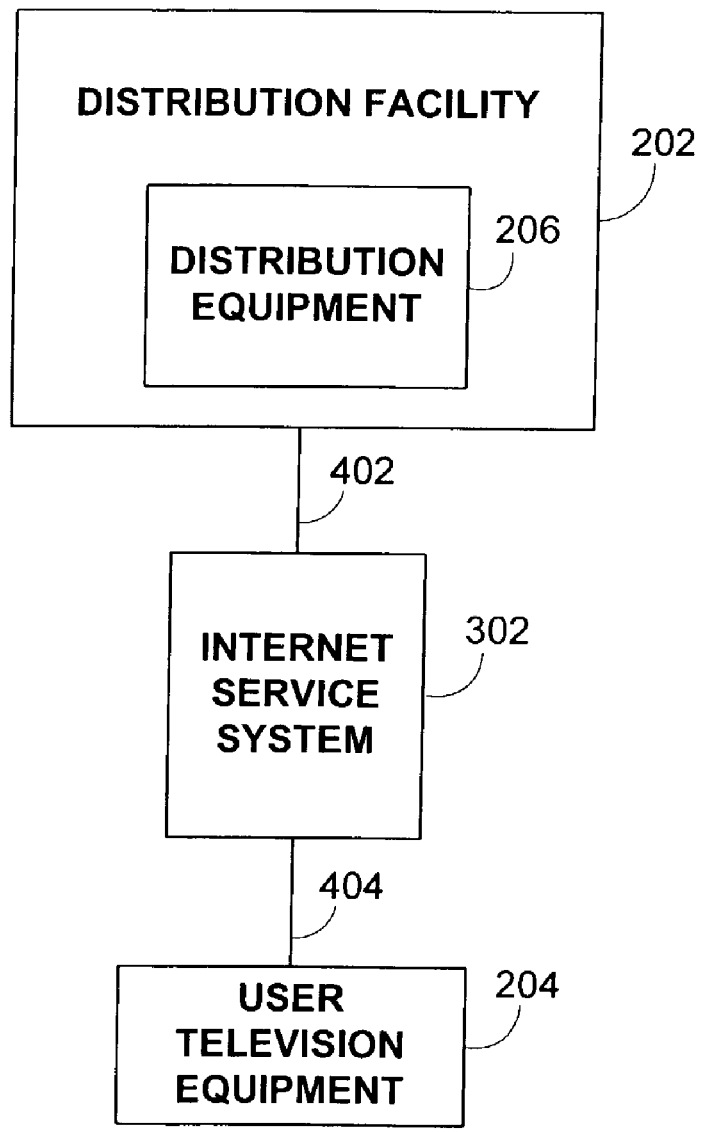

Another illustrative Internet-based approach for interactive application equipment 106 (FIG. 1) is shown in FIG. 4. In this example, distribution facility 202 may provide program guide and fantasy sports contest data (e.g., program listings, real-life sports scores, advertisements, etc.) to user television equipment 204 via Internet service system 302 and suitable communications paths 402 and 404. There may be multiple installations of user television equipment 204 and multiple associated communication paths 404, although only one user television equipment 204 and communications path 404 are shown in FIG. 4 to avoid over-complicating the drawing.

Internet service system 302 of FIG. 4 may be any suitable combination of hardware and software capable of providing program guide data from distribution equipment 206 to user television equipment 204 using an Internet based approach (e.g., the HyperText Transfer Protocol (HTTP)). Communications paths 402 and 404 may have sufficient bandwidth to allow distribution facility 202 to distribute television programming and other video media to user television equipment 204 via Internet service system 406. For example, Internet service system 302 may transmit regular television programming and highlight video clips for sporting events related to a fantasy sports contest in which the user participates to user television equipment 204.

Internet service system 302 may provide video, program guide data, and fantasy sports contest data from data sources on the Internet to user television equipment 204. For example, a news data source may provide sports news data related to a fantasy sports contest in which the user participates to user equipment 204 using Internet service system 302. In some embodiments of the present invention, main facility 102 (FIG. 1), external data service 110 (FIG. 1), or any other suitable facility or location may provide data to user television equipment 204 via Internet service system 302, or other separate Internet service system.

In some embodiments of the present invention, an interactive television program guide application may run at least partially on one or more of user television equipment 204, distribution facility 202, main facility 102 (FIG. 1), external data service 110 (FIG. 1), or any other suitable component (which is not necessarily shown in FIGS. 1-7) of an interactive television program guide application system using a suitable client-server or distributed processing arrangement. Client-server program guide systems are described, for example, in Ellis et al. U.S. patent application Ser. No. 09/374,043, filed Aug. 13, 1999, which is hereby incorporated by reference herein in its entirety.

Figure 5:
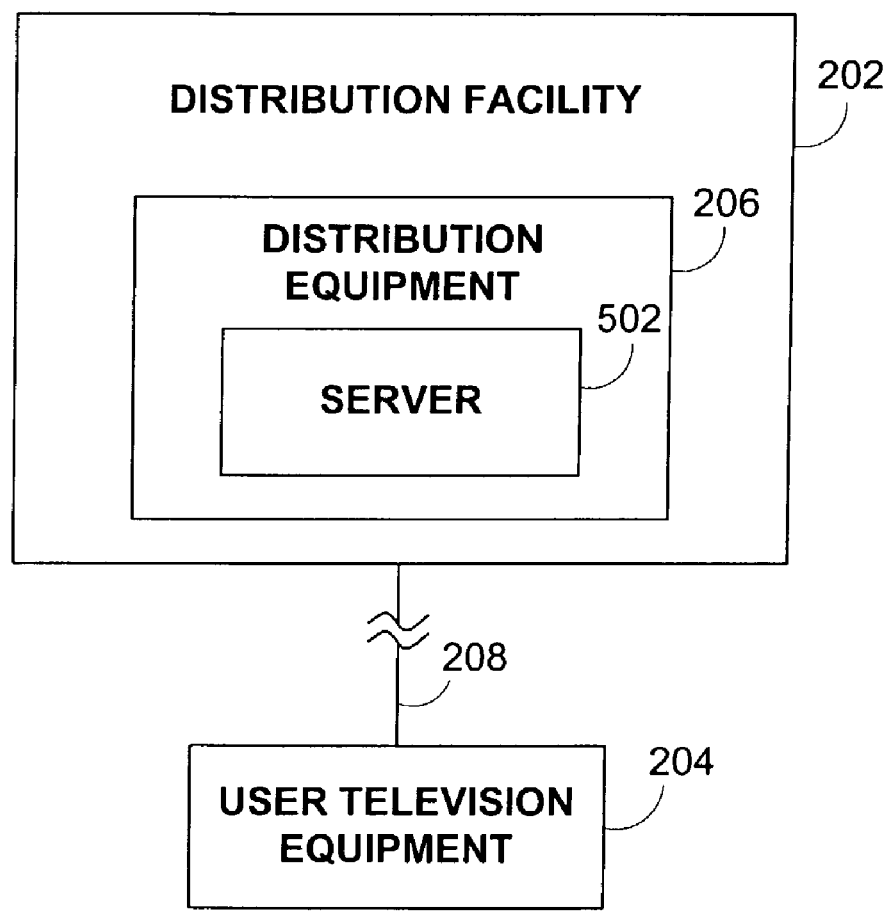

An illustrative client-server arrangement of interactive application equipment 106 (FIG. 1) is shown in FIG. 5. Distribution equipment 206 may include server 502. An application client running on user television equipment 204 may retrieve program guide data from server 502 using any suitable client-server based approach. The client may, for example, pass SQL (structured query language) requests as messages to server 502. In another suitable approach, the application client may invoke remote procedures that reside on server 502 using one or more remote procedure calls. Server 502 may execute SQL statements for such invoked remote procedures. In another suitable approach, client objects executed by the application may communicate with server objects executed by server 502 using, for example, an object request broker (ORB). Server 502 may, for example, run a suitable database engine (e.g., SQL Server by Microsoft) and provide data to an application client implemented on user television equipment 204. In some embodiments of the present invention, server 502 may provide one or more of program guide data and fantasy sports contest data to user equipment 204 using a "push" methodology (e.g., forced messages). For example, server 502 may automatically transmit e-mail and update messages (e.g., updates of real-life sports scores or fantasy sports contest standings) to user equipment 204.

In some embodiments of the present invention, server 502 may request or otherwise receive program guide and fantasy sports contest data from program guide data and fantasy sports contest data source 104 of main facility 102 (FIG. 1). Fantasy sports contest data received from main facility 102 may be utilized to, for example, generate interactive television program guide application display screens having up to date information (e.g., sports scores, fantasy sports contest standings, an indication of current and future programs that are related to a fantasy sports contest in which the user participates, etc.). Server 502 may, for example, utilize schedule localizations containing one or more of program guide data and fantasy sports contest data from main facility 102 (FIG. 1) to generate accurate application display screens.

In some embodiments of the present invention, server 502 may receive program guide and fantasy sports contest data from an external data service such as external data service 110 (FIG. 1). In some embodiments of the present invention, one or more of program guide and fantasy sports contest data may originate at distribution facility 202. For example, an operator at distribution facility 202 may input data for a user's account (e.g., data indicating whether a user is ineligible to participate in fantasy sports contests based on non-payment of a monthly fee) for storage on server 502.

In some embodiments of the present invention, server 502 may, in response to client requests, transmit program guide and fantasy sports contest data via communications path 208 to user equipment 204 for subsequent processing and application display screen generation. For example, server 502 may provide application data to user television equipment 204 and user television equipment 204 may subsequently process the data to provide an interactive television program guide that provides access to one or more fantasy sports contests. Server 502 may store various media (e.g., highlight video clips for events related to a fantasy sports contest in which the user participates) and provide the media to user television equipment 204 in response to program guide client requests or using a push methodology. In other embodiments, sometimes referred to as a "thin client" approach, program guide server 502 may generate program guide application display screens which are downloaded by the program guide client. If desired, server 502 may be located at main facility 102 (FIG. 1), external data service 110 (FIG. 1), or any other suitable location or a combination thereof.

Figure 6:
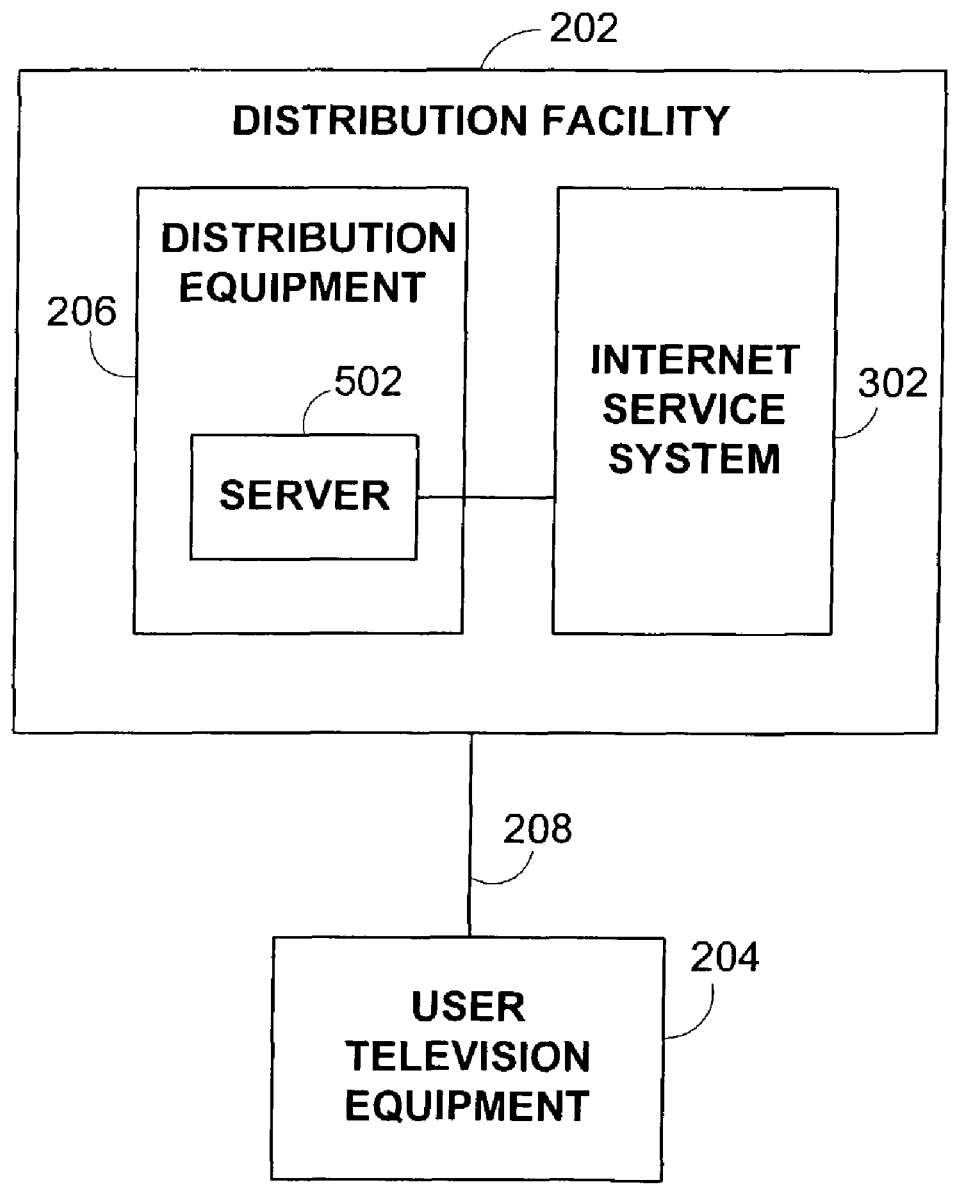

Another illustrative client-server arrangement is shown in FIG. 6. In this example, Internet service system 302 may provide program guide and fantasy sports contest data from the Internet to server 502. Internet service system 302 of FIG. 6 may be any suitable combination of hardware and software capable of providing data to server 502 using an Internet based approach (e.g., the HyperText Transfer Protocol (HTTP)). Internet service system 302 may provide data to server 502 continuously, daily, in response to server 502 requests, in response to user television equipment 204 requests, or in any other suitable approach.

Figure 7:
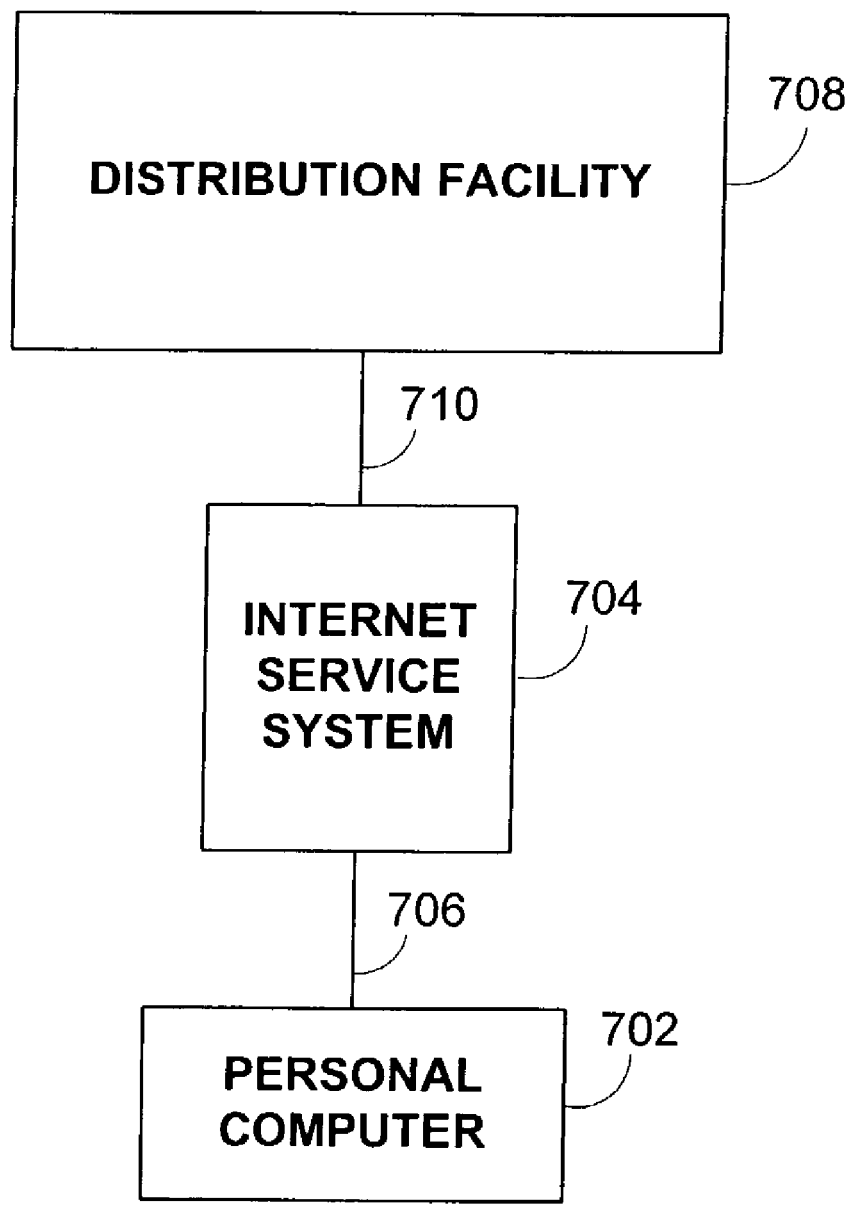

FIG. 7 shows an illustrative arrangement for interactive application equipment 106 for providing an online program guide. Illustrative on-line program guide systems are described, for example, in Boyer et al. U.S. patent application Ser. No. 08/938,028, filed Sep. 18, 1997, which is hereby incorporated by reference herein in its entirety. Interactive application equipment may have personal computer (PC) 702 on which a program guide client or web browser is implemented. Personal computer 702 may be connected to Internet service system 704 via Internet link 706. Internet service system 704 may use any suitable combination of computer hardware and software capable of providing an on-line program guide server application or website (e.g., by providing HTML web pages using HTTP). In the embodiment of FIG. 7, distribution facility 708 may provide Internet service system 704 with program guide and fantasy sports contest data. Distribution facility 708 may be any suitable equipment for distributing program guide and fantasy sports contest data (e.g., a cable system headend, a satellite distribution facility, a broadcast distribution facility, or any other suitable type of distribution facility) to Internet service system 704 via Internet link 710. In other suitable approaches, other program guide application equipment or facilities such as main facility 102 (FIG. 1), external data service 110 (FIG. 1), or any other suitable source of one or more of program guide and fantasy sports contest data, or a combination thereof, may provide data to Internet service system 704.

User television equipment 204 of FIGS. 2-6 may be any suitable equipment capable of receiving, processing, and displaying data in an interactive television program guide application (e.g., personal computer televisions (PC/TVs), personal computers, cable set-top boxes or satellite receivers with sufficient processing capabilities and display devices, etc.). User television equipment 204 may receive program guide and fantasy sports contest data from distribution facility 202 (FIGS. 2-6), server 502 (FIGS. 5-6), Internet service system 302 (FIGS. 3, 4, and 6), or any other suitable facility or location or a combination thereof, and utilize the data to generate program guide application display screens that provide access to fantasy sports contests.

Figure 8:
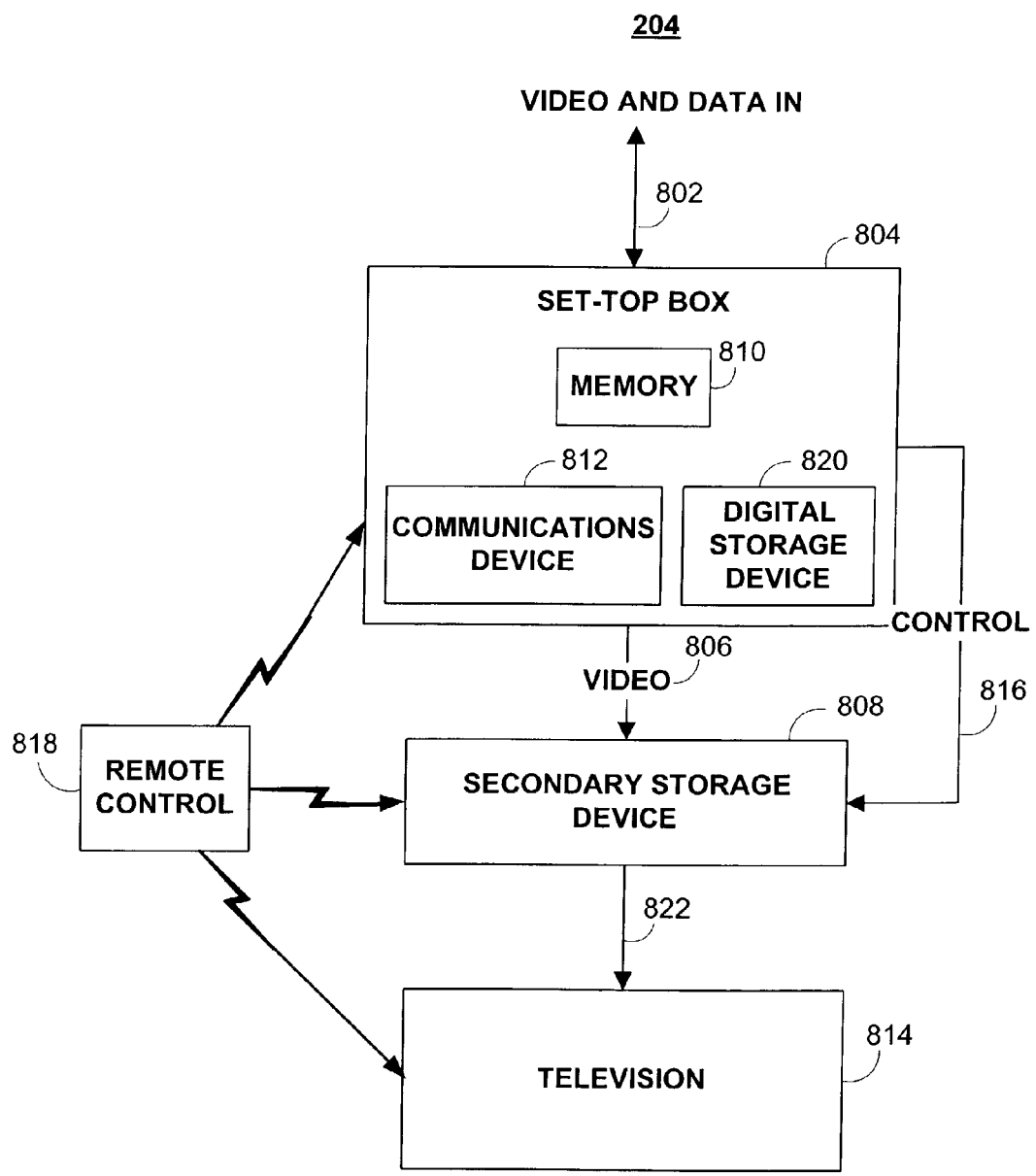
FIGS. 8-9 are illustrative arrangements of the user television equipment of FIGS. 2-6 in accordance with various embodiments of the present invention.

An illustrative arrangement for user television equipment 204 (FIGS. 2-6) is shown in FIG. 8. User television equipment 204 may receive analog or digital programming (e.g., television programming, pay-per-view programming, video-on-demand programming, etc.) and application data at input 802 from distribution facility 202 (FIGS. 2-6), main facility 102 (FIG. 1), external data service 110 (FIG. 1), Internet service system 302 (FIGS. 3-4), server 502 (FIGS. 5-6), or other suitable equipment or a combination thereof, depending on the chosen implementation.

During normal television viewing, a user may tune set-top box 804 to a desired television channel. The signal for that television channel may then be provided at video output 806. The signal supplied at output 806 is typically either a radio-frequency (RF) signal on a predefined channel (e.g., channel 3 or 4), or an analog demodulated video signal, but may also be a digital signal provided on an appropriate digital bus (e.g., a bus using the Institute of Electrical and Electronics Engineers (IEEE) 1394 standard (not shown)). The video signal at output 806 may be received by secondary storage device 808, which may be an optional component in the embodiment of FIG. 8.

Set-top box 804 may have memory 810. Memory 810 may be any memory or other storage device, such as a random access memory (RAM), read only memory (ROM), flash memory, a hard disk drive, a combination of such devices, or any memory suitable for storing application instructions and application data for use by the interactive television program guide application.

Set-top box 804 may have communications device 812 for communicating directly with distribution facility 202 (FIGS. 2-6), server 502 (FIGS. 5-6) Internet service system 302 (FIGS. 3-4, FIG. 6), external data service 110 (FIG. 1), or other suitable equipment over suitable communications paths. Communications device 812 may be a modem (e.g., cable modem, telephone modem, digital subscriber line (DSL) modem, integrated service digital network (ISDN) modem, or any suitable analog or digital modem), network interface card (e.g., an Ethernet card, etc.), or other suitable communications device. Communications device 812 may also be a personal computer with an Internet connection in, for example, the arrangements shown in FIGS. 3 and 4. In some embodiments of the present invention, communications device 812 may be a component of television 814.

Secondary storage device 808 may be any suitable type of analog or digital program storage device or player. For example, secondary storage device 808 may be a videocassette recorder (VCR) or a digital versatile disc (DVD) player. As another example, secondary storage device 808 may be a personal video recorder (PVR) or any other suitable analog or digital program storage device or player. Illustrative media recording systems including personal video recorder systems are described in Ellis et al. U.S. patent application Ser. No. 09/821,005 which is hereby incorporated by reference herein in its entirety.

In some embodiments of the present invention, application data may be stored in secondary storage device 808. Program recording and other features may be controlled by set-top box 804 using control path 816. If secondary storage device 808 is a videocassette recorder or a personal video recorder, for example, a typical control path 816 may involve the use of an infrared transmitter coupled to the infrared receiver in the recorder that normally accepts commands from a remote control such as remote control 818. Remote control 818 may be used to control set-top box 804, secondary storage device 808, and television 814.

An interactive television program guide application may run on set-top box 804, television 814 (provided that television 814 has suitable processing circuitry and memory), a suitable analog or digital receiver (not shown) connected to television 814, or digital storage device 820 if digital storage device 820 has suitable processing circuitry and memory. The interactive television program guide application may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, a user may record programming (e.g., television programs, pay-per-view programs, video-on-demand (VOD) programs, non-video-on-demand programs, etc.) in digital form on digital storage device 820. Digital storage device 820 may also record program guide and fantasy sports contest data including, for example, fantasy sports contest standings and rules, real-life sports scores and statistics, and highlight video clips for events related to a fantasy sports contest in which the user participates. Digital storage device 820 may be contained in set-top box 804 or it may be an external device connected to set-top box 804 via an input/output port and appropriate interface. Digital storage device 820 may be a writeable optical storage device (such as a DVD player capable of handling recordable DVD discs), a magnetic storage device (such as a disk drive or digital tape), or any other digital storage device. Interactive television program guide application systems that have digital storage devices are described, for example, in Hassell et al. U.S. patent application Ser. No. 09/157,256, filed Sep. 17, 1998, which is hereby incorporated by reference herein in its entirety.

Processing circuitry in set-top box 804 may format received video, audio and data signals into a digital file format. The file format may be an open file format such as the Moving Picture Experts Group (MPEG) MPEG-2 standard or the Moving Joint Photographic Experts Group (MJPEG) standard. The resulting data may be streamed to and stored in digital storage device 820, secondary storage device 808, or other storage device via an appropriate bus (not shown) (e.g., a bus using the Institute Electrical and Electronics Engineers (IEEE) 1394 standard). In some embodiments of the present invention, an MPEG-2 data stream or series of files may be received from distribution facility 202 (FIGS. 2-6), Internet service system 302 (FIGS. 3-4, and 6), or other system and stored by digital storage device 820 or secondary storage device 808.

Television 814 may receive video signals from secondary storage device 808 via communications path 822. The video signals on communications path 822 may either be generated by secondary storage device 808 when playing back a prerecorded storage medium (e.g., a videocassette or a recordable digital video disc), by digital storage device 820 when playing back a pre-recorded digital medium, may be passed through from set-top box 804, may be provided directly to television 814 from set-top box 804 if secondary storage device 808 is not included in user television equipment 204 (FIGS. 2-6), or may be received directly by television 814 from any other suitable facility or location (e.g., main facility 102 (FIG. 1)). During normal television viewing, the video signals provided to television 814 may correspond to the desired channel to which a user has tuned with set-top box 804. Video signals may also be provided to television 814 by set-top box 804 when set-top box 804 is used to play back information stored on digital storage device 820.

Figure 9:
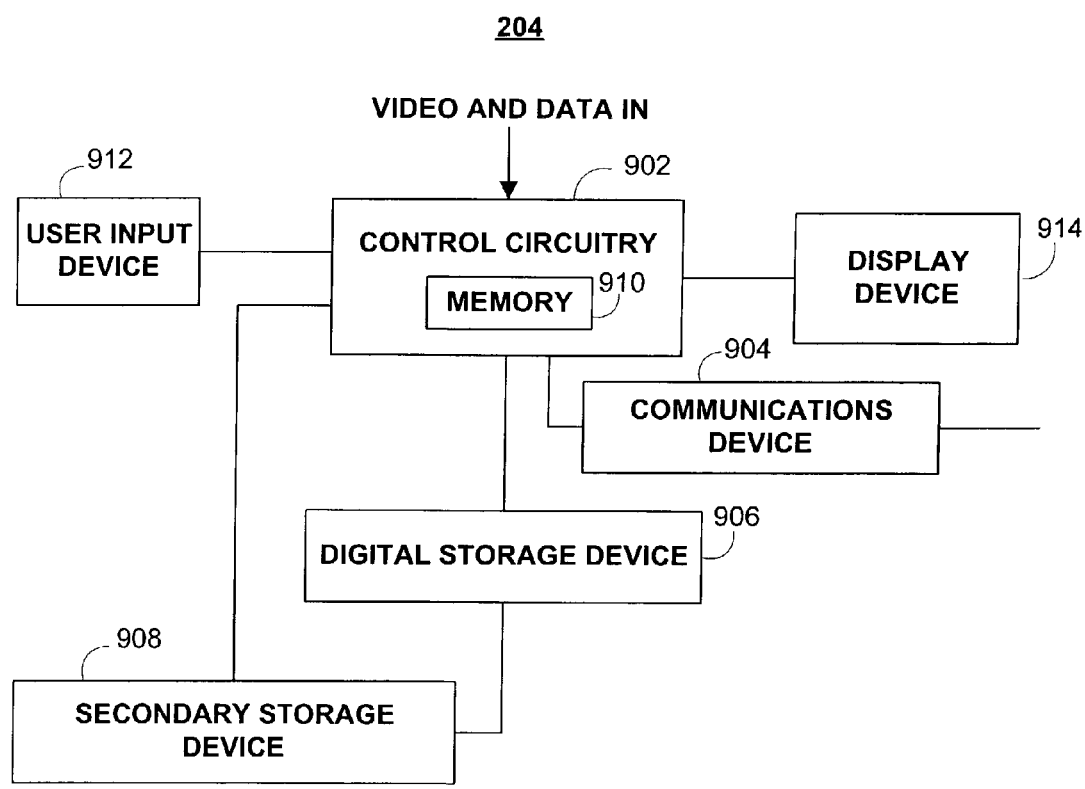

FIG. 9 is a illustrative schematic block diagram of portions of user television equipment 204 (FIGS. 2-6) in accordance with various embodiments of the present invention. Program guide and fantasy sports contest data from distribution facility 202 (FIGS. 2-6), main facility 102 (FIG. 1), external data service 110 (FIG. 1), server 502 (FIGS. 5-6), Internet service provider 302 (FIGS. 3, 4, and 6), or other suitable equipment or location may be received by control circuitry 902 or received by communications device 904 and provided to control circuitry 902.

Control circuitry 902 may include a processor or processing circuitry for receiving and processing program guide instructions. Control circuitry 902 may include any suitable processor, such as a microprocessor or group of microprocessors, and other processing circuitry such as caching circuitry, direct memory access (DMA) circuitry, input/output (I/O) circuitry, etc. For example, control circuitry 902 may process application instructions to generate program guide application display screens. As another example, control circuitry 902 may process program guide and fantasy sports contest data to provide record commands to a suitable storage device (e.g., record commands for programs related to a fantasy sports contest in which the user participates). Still another example, control circuitry 902 may maintain a user viewing history and process program guide data to generate a list of program recommendations or to provide targeted advertisements to a user (e.g., providing an ad to join a fantasy football contest to a user that has a history of viewing real-life football programming). The functions of control circuitry 902 may be integrated into an advanced television receiver, personal computer television (PC/TV), or any other suitable arrangement. If desired, a combination of such arrangements may be used.

Digital storage device 906 and secondary storage device 908 may record media and store program guide and fantasy sports contest data. Secondary storage device 908 may be any suitable type of analog or digital program storage device (e.g., a videocassette recorder (VCR), a personal video recorder (PVR), a digital versatile disc (DVD), etc.). Digital storage device 906 may be, for example, a writeable optical storage device (such as a DVD player capable of handling recordable DVD discs), a magnetic storage device (such as a disk drive or digital tape), or any other digital storage device. Program recording and other features may be controlled by control circuitry 902. For example, control circuitry 902 may instruct secondary storage device 908 and digital storage device 906 to record television programming or any other suitable media.

Memory 910 may be any memory or other storage device, such as a random access memory (RAM), read only memory (ROM), flash memory, a hard disk drive, a combination of such devices, etc., that is suitable for storing application data for use by control circuitry 902.

Communications device 904 may support communications between user television equipment 204 and distribution equipment 202 (FIGS. 2-6), server 502 (FIGS. 5-6), Internet service system 302 (FIGS. 3, 4, and 6), external data service 110 (FIG. 1), or other suitable equipment or location. Communications device 904 may be a modem (e.g., a cable modem, digital subscriber line (DSL) modem, telephone modem, integrated services digital network (ISDN) modem, or any suitable analog or digital modem), network interface card (e.g., an Ethernet card, Token ring card, etc.) or any other suitable communications device.

User input device 912 may be any suitable input device for allowing a user to communicate to the interactive television program guide application. For example, a user may select a program listing from a program guide listings display screen or order a pay-per-view program using user input device 912. As another example, a user may make fantasy sports contest roster selections or select a program for automatic recording or reminding using user input device 912.

User input device 912 may be a pointing device, wireless remote control, keyboard, touch-pad, voice recognition system, or any other suitable user input device. User-entered instructions from user input device 912 may instruct control circuitry 902 to direct an audio device (not shown) to provide audio (e.g., music, talk-radio, television audio, etc.). During normal television viewing, user-entered instructions from user input device 912 may instruct control circuitry 902 to direct display device 914 to display a desired television channel on display device 914. Display device 914 may be any suitable television, monitor, or other suitable display device. To provide a user with program guide and fantasy sports contest options, the program guide application running on user television equipment 204 (FIGS. 2-6, and 8) may generate, for example, a program listings display screen, a program guide information display screen, a fantasy sports contest display screen, a pay-per-view display screen, or other desired display screen for display on display device 914.

In some embodiments of the present invention, the program guide application may, based on program guide and fantasy sports contest data supplied to user television equipment 204, generate control data that governs the recording of programs related to a fantasy sports contest in which the user participates on digital storage device (820, 906), secondary storage device (808, 908), or any other storage device used in user television equipment 204. The program guide application may, for example, use program guide and fantasy sports contest data to determine which programs are related to a fantasy sports contest in which the user participates and may instruct digital storage device (820, 906) or secondary storage device (808, 908) to record those programs. As another example, the program guide application may determine for the user which programs are related to a fantasy sports contest in which the user participates and may allow the user to select one or more of those programs for recording. Still another example, the program guide application may generate control data that commands secondary storage device (808, 908) or digital storage device (820, 906) to record a second program related to a fantasy sports contest in which the user participates when a first related program that was designated for recording is no longer available (e.g., due to a program blackout).

In some embodiments of the present invention, the program guide application may provide to the user the ability to define a default fantasy sports contest for which related programs will be automatically recorded (e.g., by digital storage device (820, 906)). For example, in embodiments in which the user participates in multiple fantasy sports contests, the user may attribute a record priority to each of the fantasy sports contests. The interactive television program guide may use such priorities to determine which program or programs to record when multiple programs related to the user's fantasy sports contests are simultaneously showing. The interactive television program guide application may also provide to the user the ability to attribute record priorities to programs for real-life athletic events related to a particular fantasy sports contest (e.g., attributing a higher record priority to real-life Baltimore Orioles games related to the user's fantasy Major League Baseball contest than the record priority for real-life New York Mets games). The program guide may instruct communications device (812, 904) to selectively receive or tune such a program and may instruct a recording device (e.g., digital storage device (820, 906), secondary storage device (808, 908), etc.) to record the program based on the attributed priorities. In some embodiments of the present invention, the program guide application may determine for the user record priorities that govern automatic recording of programs. For example, when more than one program related to a fantasy sports contest in which the user participates is simultaneously showing, the interactive television program guide application may determine which of the programs to record based on the relevance of the programs to the user's fantasy sports contest (e.g., determining for each of the programs how many of user's fantasy sports contest roster selections are involved or scheduled to participate, determining whether one or more of the programs is a re-run of a sporting event and therefore its relevant outcomes and statistics already having been incorporated to affect the user's fantasy sports contest standing, etc.).

In some embodiments of the present invention, the program guide application may display a list of programs related to one or more fantasy sports contests in which the user participates. The program guide may provide to the user the ability to set record or remind options for one or more of the programs. In some embodiments of the present invention, the program guide application may display to a user (e.g., in an information display screen) information that indicates which of a user's fantasy sports contest roster selections are involved or scheduled to participate in the related programs.

Program guide data and fantasy sports contest data may be integrated to provide an at least partially unified presentation at user equipment 120. For example, program guide data may be displayed in a first region of a display screen and fantasy sports contest data may be displayed in a second region of the display screen. As another example, program guide data may be displayed in a first display screen that includes a user-selectable option to view fantasy sports contest data in a second display screen. Still another example, program guide and fantasy sports contest data may be fully integrated and inter-mingled in the same display screens.

An interactive television program guide application implemented on interactive application equipment 106 (FIGS. 1-6) may change its displays and available options based on received program guide and fantasy sports contest data. FIGS. 10-25 show interactive television program guide application display screens in accordance with various embodiments of the present invention. The display screens of FIGS. 10-25 are only illustrative. Any other suitable user interface approach may be used. For example, other illustrative interface displays for an interactive television program guide application are described in Moore et al. U.S. patent application Ser. No. 09/668,678, filed Sep. 22, 2000, and Knudson et al. U.S. patent application Ser. No. 09/357,941, which are hereby incorporated by reference herein in their entireties.

Figure 10:
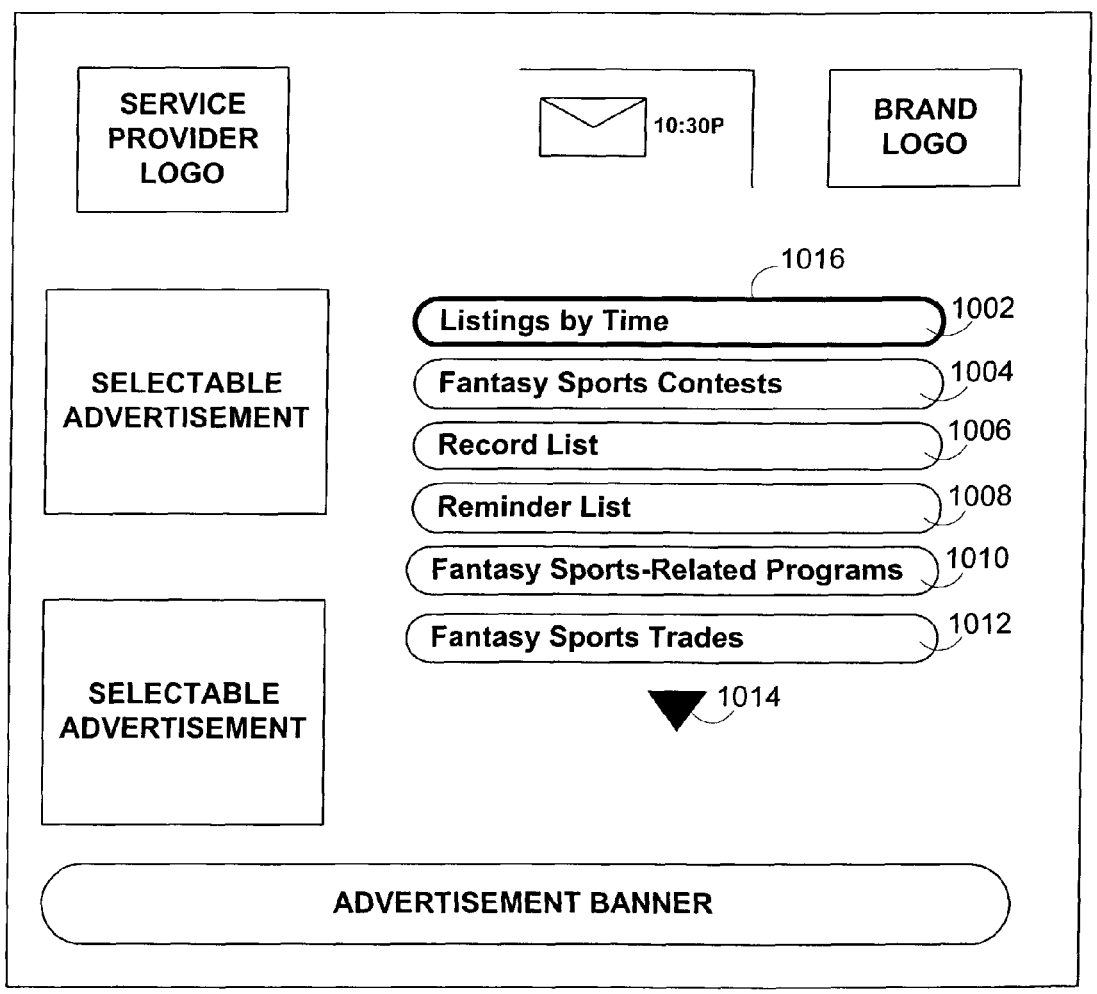
FIG. 10 is an illustrative interactive television program guide application menu display screen in accordance with one embodiment of the present invention.

FIG. 10 shows an illustrative interactive television program guide menu display screen 1000. The interactive television program guide application may display display screen 1000 in response to, for example, a user selection of a "Guide" button from remote control 818 (FIG. 8) or any other option to access the interactive television program guide application. Display screen 100 pay include various program guide and fantasy sports contest options and information. For example, display screen 1000 may include option 1002 to view program listings by time, option 1004 to access information for fantasy sports contests, option 1006 to view information for the user's record list, option 1008 to view information for the user's reminder list, option 1010 to view information for programs related to a fantasy sports contest in which the user participates, and option 1012 to access information for fantasy sports contest trades. Arrow 1014 may indicate that additional program guide and fantasy sports contest information and options (e.g., an option to view program listings by genre or channel, an option to search for program by title, etc.) can be accessed in response to, for example, a user selection of a "Down" button from remote control 818 (FIG. 8).

Figure 11:
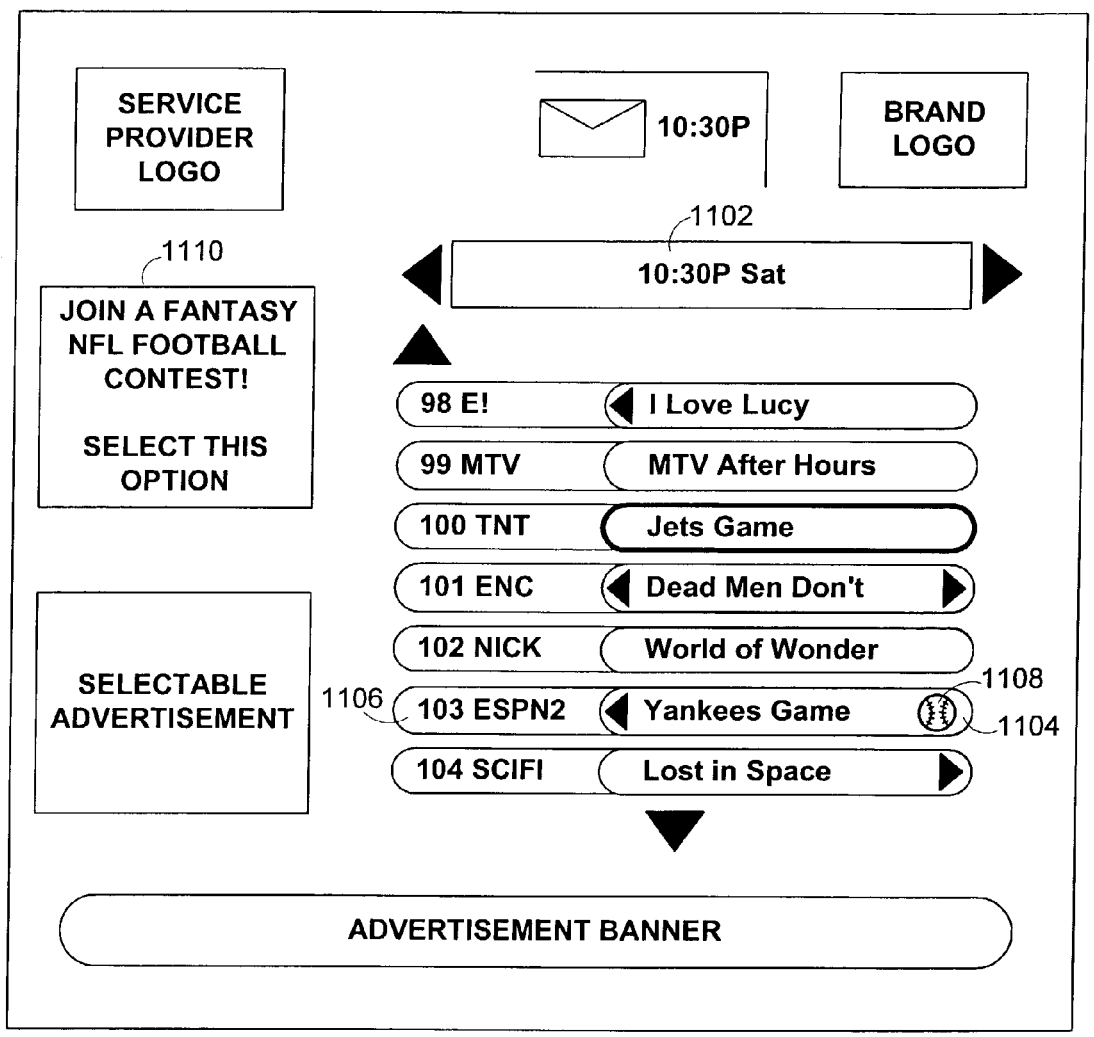
FIG. 11 is an illustrative interactive television program guide application listings display screen in accordance with one embodiment of the present invention.

FIG. 11 shows an illustrative program listings display screen 1100. Referring to FIGS. 10 and 11, the interactive television program guide application may display display screen 1100 in response to a user indication of option 1002 to view program listings by time or any other option to view program guide information. For example, the user may position highlight region 1016 on option 1002 and select an "Enter" button from remote control 818 (FIG. 8) to view display screen 1100. Display screen may 1100 may include various program listings for a specific time period 1102. In this example, program "Yankees Game" 1104 is available on channel "103 ESPN2" 1106. The interactive television program guide application may display icon 1108 in the guide listing for program 1104 to indicate that program 1104 is related to a fantasy sports contest in which the user participates (e.g., a fantasy Major League Baseball contest). For example, icon 1108 may indicate that program "Yankees Game" 1104 includes one or more real-life players that have been fictitiously selected to the user's fantasy sports contest team roster (e.g., the statistics of these real-life players affecting the user's fantasy sports contest point total). As another example, icon 1108 may indicate that program 1104 affects the user's standing in a fantasy sports contest without necessarily including any real-life players that have been selected to the user's fantasy roster (e.g., in a fantasy sports contest in which the user's standing is affected by outcomes of particular games, the real-life players of which may not necessarily be selected to the user's fantasy roster). The program guide may tune to program 1104 in response to a user selection of program 1104 (e.g., by pressing an "Enter" button from remote control 818 (FIG. 8)). The information of display screen 1100 also indicates that program "Jets Game" 1112 is available on channel "100 TNT" 1114. In this example, program 1112 may be unrelated to a fantasy sports contest in which the user participates. Accordingly, the guide listing for program 1112 may not include an indicator such as icon 1108.

Icon 1108 is merely illustrative and any other suitable indicator may be used to indicate that a television program (e.g., program 1104) is related to a fantasy sports contest in which the user participates. For example, other suitable indicators may include a text indicator, a graphic indicator, displaying a guide listing in a different color than guide listings for programs unrelated to a fantasy sports contest in which the user participates, or any other suitable indicator or combination thereof. In embodiments in which the user participates in multiple fantasy sports contests, the interactive television program guide application may associate a different indicator with each of the fantasy sports contests to allow the user to easily determine to which contest a program is related. In some embodiments of the present invention, the interactive television program guide application may display indicators in guide listings for programs that are unrelated to a fantasy sports contest in which the user participates to, for example, alert the user that a fantasy sports contest exists in connection with that program and to encourage the user to participate in that contest.

In some embodiments of the present invention, the interactive television program guide application may display targeted advertisements to current or potential fantasy sports contestants (e.g., promotional videos, advertisements that encourage a user to participate in fantasy sports contests, etc.). For example, in response to a user navigating to a guide display screen that includes information for a program related to a fantasy sports contest (e.g., in which the user does or does not participate), the interactive television program guide application may display an advertisement that encourages the user to participate in that fantasy sports contest. As another example, the interactive television program guide application may display advertisements that encourage the user to participate in fantasy sports contests based on a maintained viewing history that indicates the user's interests (e.g., displaying an advertisement to join a fantasy NBA Basketball contest to a user that frequently views NBA Basketball events).

Figure 12:
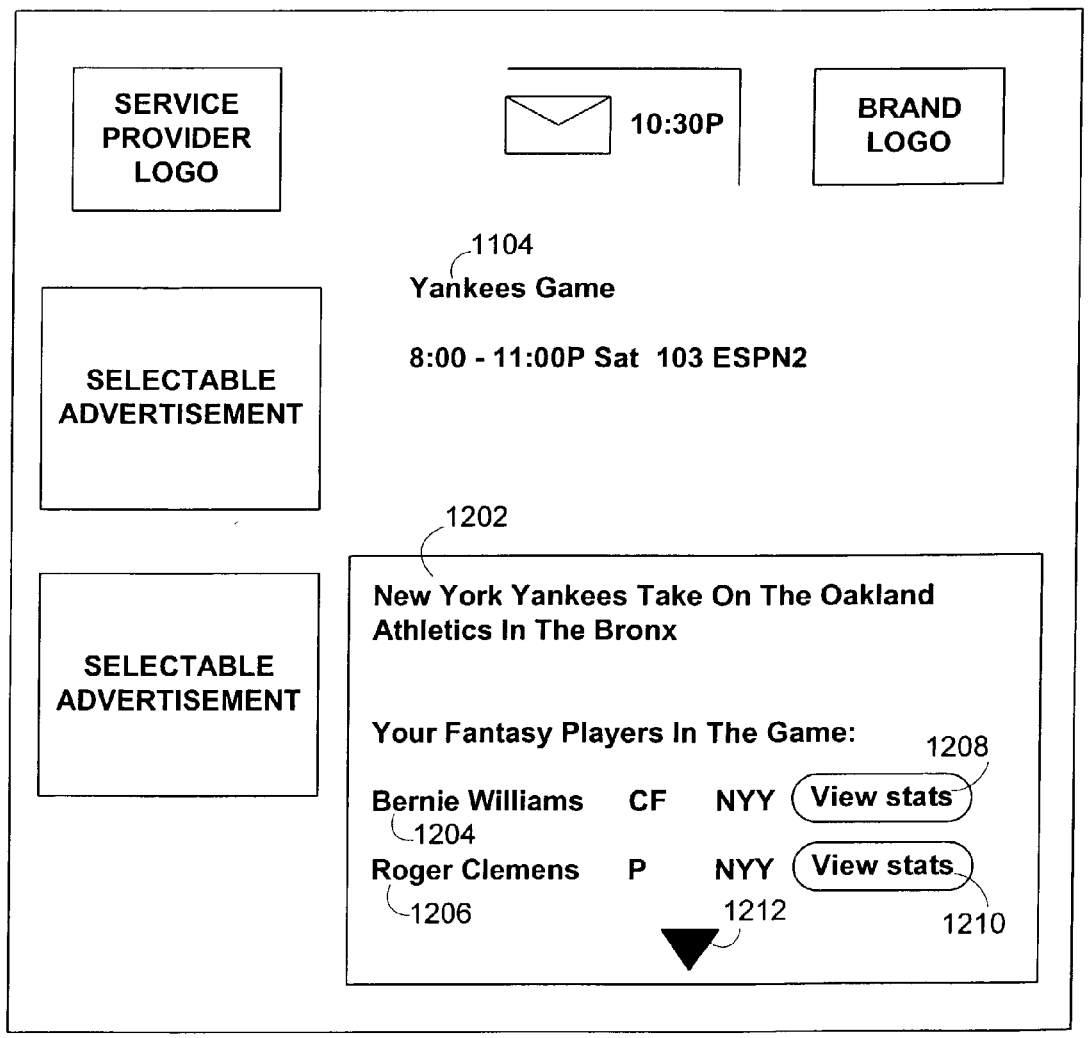
FIG. 12 is an illustrative interactive television program guide application information display screen in accordance with one embodiment of the present invention.

In some embodiments of the present invention, the interactive television program guide application may provide to a user the ability to view more detailed information for programs than the information listed in, for example, program listings display screens. Referring to FIGS. 11 and 12, the interactive television program guide application may display display screen 1200 in response to a user selection of program 1104 (e.g., a user positioning a highlight region on the program listing for program 1104 and selecting an "Info" button from remote control 818 (FIG. 8)). Display screen 1200 may include various additional information for program 1104 such as program description 1202 and any other information for program 1104 (e.g., information relating to the purchase of tickets for "Yankees Game" 1104 or similar future events). Display screen 1200 may also include a list of real-life players that are involved in "Yankees Game" 1104 and that have been fictitiously selected to the user's fantasy sports contest roster, or any other information related to a fantasy sports contest in which the user participates (e.g., information indicating the user's fantasy sports point total, the user's standing in the fantasy sports contest, or any other information indicating the user's performance in the fantasy sports contest). In this example, the information of display screen 1200 indicates that real-life sports players "Bernie Williams" 1204 and "Roger Clemens" 1206 are involved in "Yankees Game 1104" and have been fictitiously selected (e.g., drafted exclusively) to the user's fantasy sports contest team roster. The user may be permitted to view statistics data for each of players 1204 and 1206 (e.g., real-life statistics, fantasy sports contest statistics such as points earned for the user by virtue of real-life accomplishment, etc.) in response to user selections of options 1208 and 1210, respectively. Arrow 1212 may indicate that additional program guide and fantasy sports contest information is available to the user (e.g., information associated with additional real-life players that have been fictitiously selected to the user's fantasy sports contest team roster).

Figure 13:
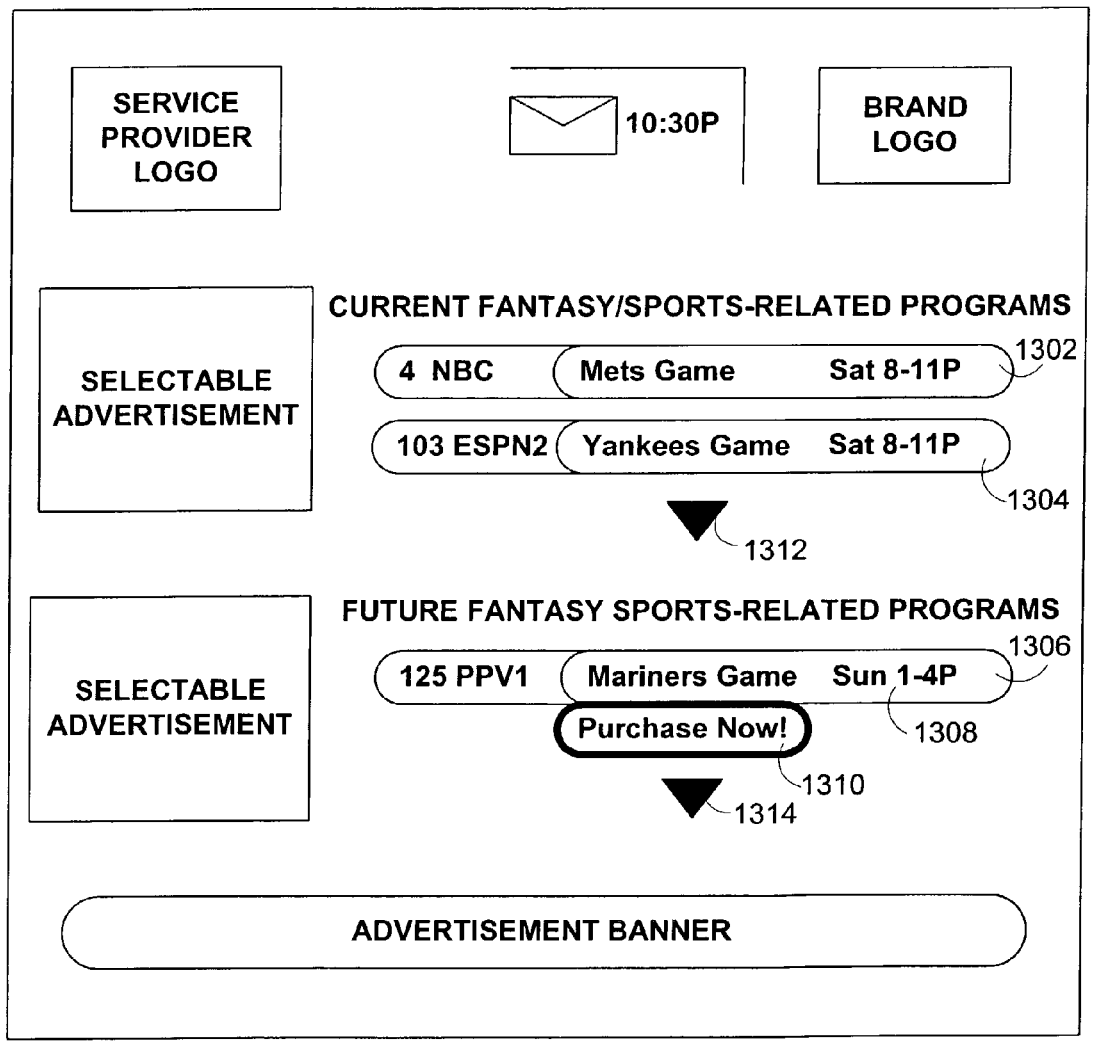
FIG. 13 is an illustrative interactive television program guide application fantasy sports-related programs display screen in accordance with one embodiment of the present invention.

In some embodiments of the present invention, the interactive television program guide application may display to a user a list of programs related to one or more fantasy sports contests in which the user participates. Referring to FIGS. 10 and 13, the interactive television program guide application may display display screen 1300 in response to a user selection of option 1010 to view information for fantasy sports-related programs. Display screen 1300 may include a list of fantasy sports-related programs that are currently available for viewing by the user such as programs "Mets Game" 1302 and "Yankees Game" 1304 (e.g., related to a fantasy Major League Baseball contest in which the user participates). The interactive television program guide application may tune to a currently available program in response to a user selection of the program (e.g., after the user has purchased the program if the program is a pay-program).

Display screen 1300 may also include a list of fantasy sports-related programs that will be available for viewing by the user at some time in the future such as program "Mariners Game" 1306. As shown, program 1306 may be a pay-per-view program that is scheduled to occur at a later date 1308. The user may be permitted to order program 1306 in response to a user selection of option "Purchase Now!" 1310. Arrows 1312 and 1314 may indicate that additional information for fantasy sports-related programs (e.g., for one or more of currently available programs and programs available in the future, information for real-life players that have been fictitiously selected to the user's fantasy sports contest team roster) is available for viewing by the user in response to, for example, a user selection of a "Down" button from remote control 818 (FIG. 8). The interactive television program guide application may provide to the user the ability to view more detailed information (e.g., similar to the more detailed information of display screen 1200 (FIG. 12)) for the program listings of FIG. 13 in response to a user selection of those programs (e.g., a user selection of an "Info" button from remote control 818 (FIG. 8) while the program listing for one of the programs is highlighted by a highlight region).

Figure 14:
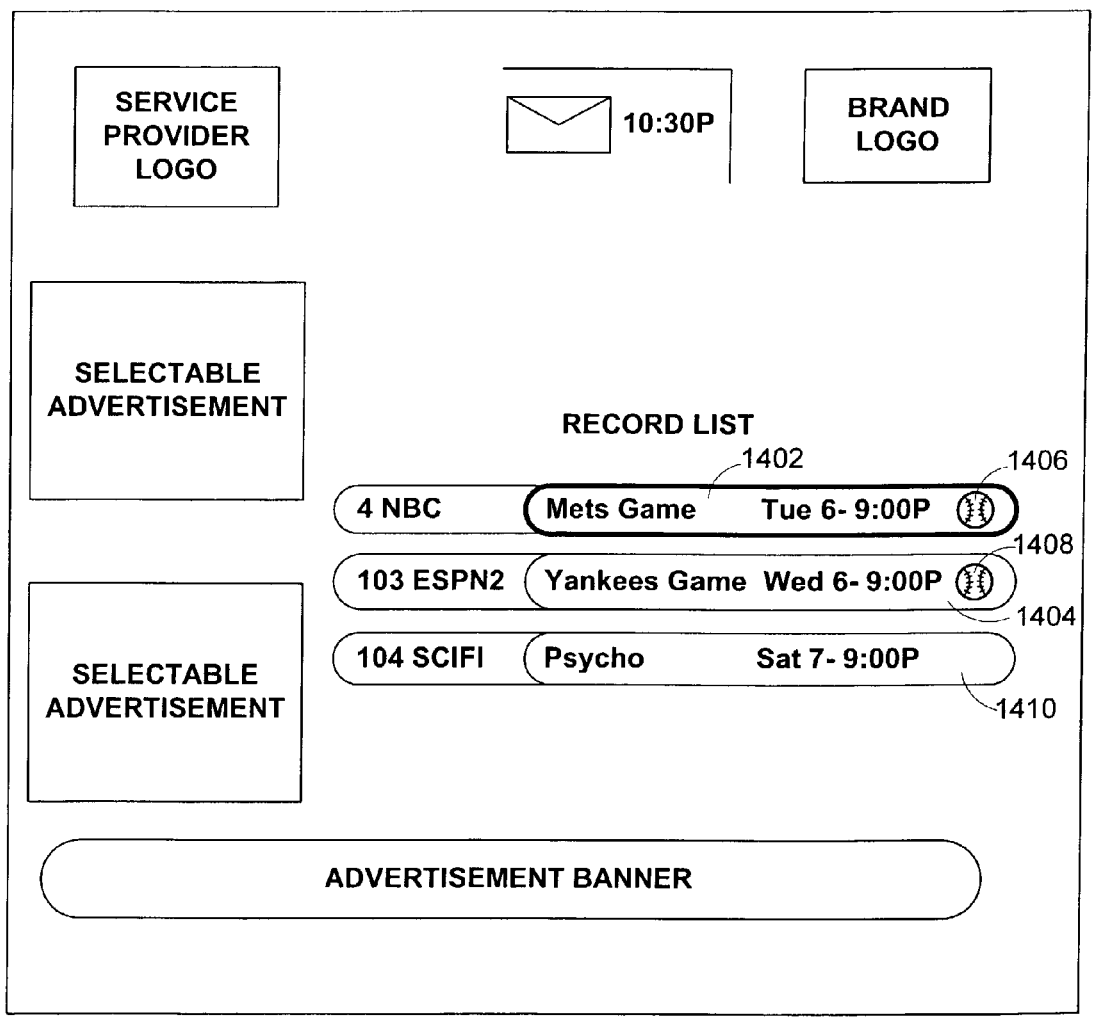
FIG. 14 is an illustrative interactive television program guide application record list display screen in accordance with one embodiment of the present invention.

In some embodiments of the present invention, the interactive television program guide application may automatically record programs related to a fantasy sports contest in which the user participates. Referring to FIGS. 10 and 14, the interactive television program guide application may display display screen 1400 in response to a user selection of option 1006 or other option to view information for the user's record list. Display screen 1400 may include, for example, a list of programs related to a fantasy sports contest in which the user participates that have been scheduled for automatic recording such as programs "Mets Game" 1402 and "Yankees Game" 1404. Programs 1402 and 1404 may have associated therewith indicators 1406 and 1408, respectively, or any other suitable indicator to indicate that programs 1402 and 1404 are fantasy-sports related programs. In this example, indicators 1406 and 1408 may be the same and may indicate that programs 1402 and 1404 relate to the same fantasy sports contest of the user. Display screen 1400 may also include a list of programs unrelated to a fantasy sports contest in which the user participates that have been scheduled for automatic recording such as program "Psycho" 1410. The interactive television program guide application may display to a user one or more of information for programs that have been previously recorded (e.g., and thus are available for viewing by the user) and information for programs that are currently being recorded (e.g., in separate display screens that are similar to display screen 1400).

In some embodiments of the present invention, the interactive television program guide application may schedule for the user programs related to a fantasy sports contest in which the user participates for automatic recording. The interactive television program guide application may, for example, determine in which one or more fantasy sports contests the user participates, determine which programs are related to those fantasy sports contests, and subsequently schedule those fantasy-sports related programs for recording. In the event that the number of simultaneously showing fantasy sports-related programs exceeds the recording capability of the interactive television program guide application system (e.g., when two fantasy sports related programs are simultaneously showing and the system is capable of recording only one program at a time), the application may, for example, schedule only the program or programs that are the most relevant to a fantasy sports contest of the user for recording (e.g., scheduling for recording the one or more programs having involved the highest percentage of players on a user's fantasy sports contest team roster).

Figure 15:
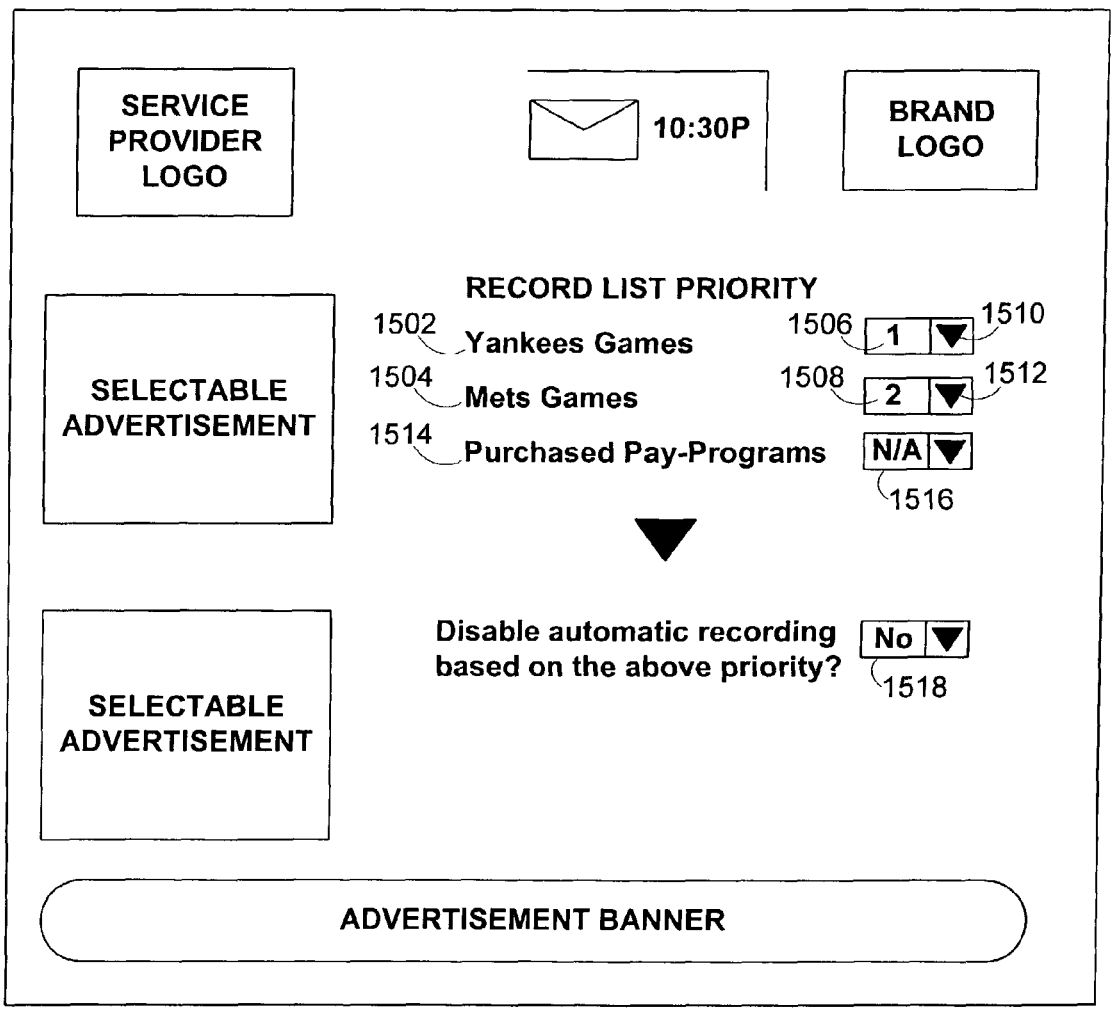
FIG. 15 is an illustrative interactive television program guide application record list priority display screen in accordance with one embodiment of the present invention.

In some embodiments of the present invention, the interactive television program guide application may provide to a user the ability to define a record priority that governs automatic recording of programs related to a fantasy sports contest in which the user participates. FIG. 15 shows an illustrative record list priority display screen 1500. Display screen 1500 may include a list of program types and associated priorities for programs related to one or more fantasy sports contests of the user such as program types "Yankees Games" 1502 and "Mets Games" 1504. As shown, the user may define that "Yankees Games" 1502 are automatically recorded with first priority 1506 (e.g., highest priority) and that "Mets Games" 1504 are automatically recorded with second priority 1508 (e.g., lower than priority 1506). The user may be permitted to change priority levels of each of program types 1506 and 1508 using, for example, pull-down menus 1510 and 1512, respectively. In embodiments of the present invention in which the user participates in more than one fantasy sports contest, the interactive television program guide may provide to the user the ability to define priority levels for each of the user's fantasy sports contests in addition to, or in place of, the priority levels for various program types of programs related to the fantasy sports contests in which the user participates. For example, the user may define that programs related to the user's fantasy NBA basketball contest are recorded with higher priority than programs related to the user's fantasy Major League Baseball contest.

In some embodiments of the present invention, the interactive television program guide application may provide to the user the ability to define record priorities for program types unrelated to a fantasy sports contest in which the user participates. For example, display screen includes program type "Purchased Pay-Programs" 1514 having a priority level "N/A" 1516. The user may have chosen to exclude program type "Purchased Pay-Programs" 1514 from automatic recording based on the user-defined priority because, for example, the user intends to watch purchased programs when they are broadcast to the user.

In some embodiments of the present invention, the interactive television program guide application may provide to the user the ability to disable automatic recording based on the user-defined priority. For example, the interactive television program guide application may disable automatic recording of programs based on the user-defined priority in response to a user selection of option 1518. When the user-defined priority is disabled, automatic recording of programs may be determined, for example, for the user by the interactive television program guide application (e.g., as previously described) or by the user on a program by program basis (e.g., scheduling automatic recording of a program by pressing a button of remote control 818 (FIG. 8) while information for the program is displayed in, for example, an information display screen such as display screen 12 (1200)).

Figure 16:
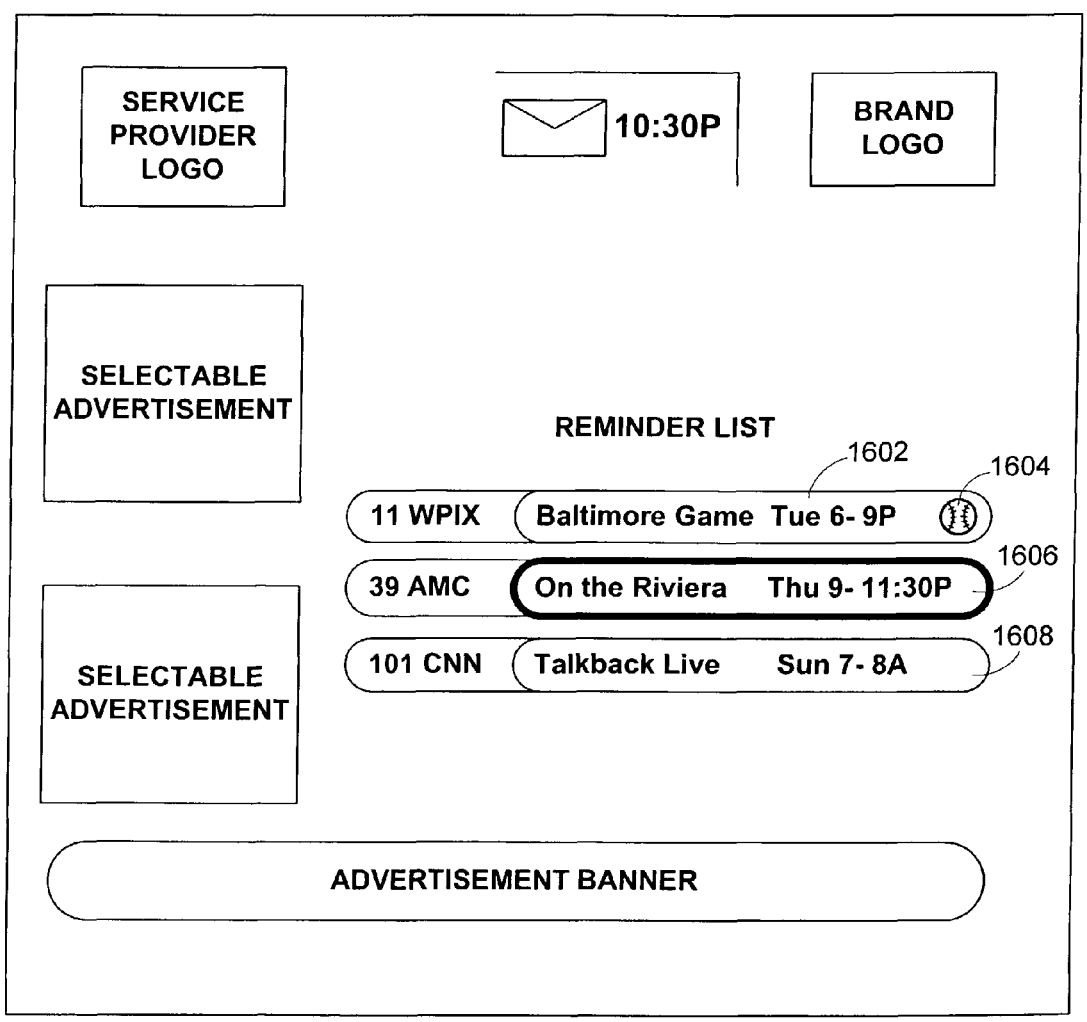
Figure 18:
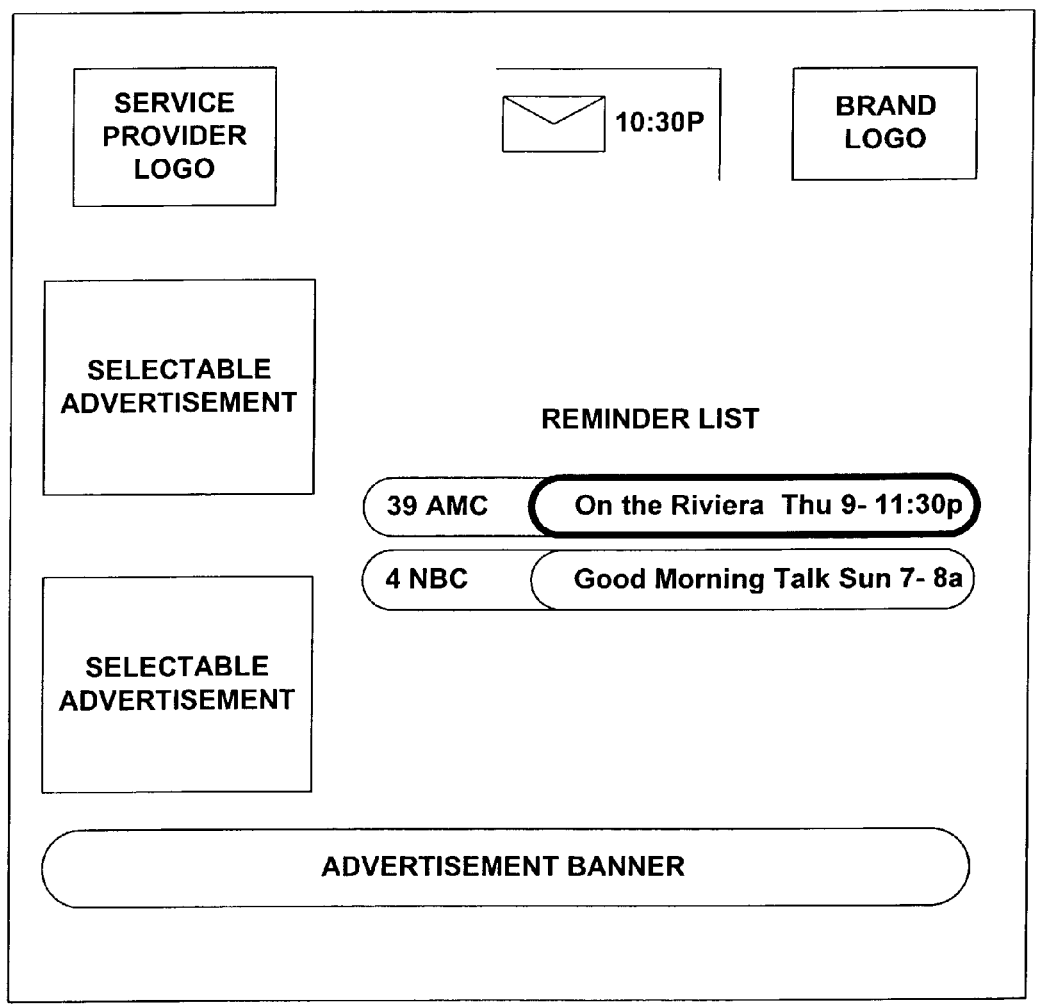

In some embodiments of the present invention, the interactive television program guide application may automatically remind users of programs related to a fantasy sports contest in which the user participates. Referring to FIGS. 10 and 16, the interactive television program guide application may display display screen 1600 in response to a user selection of option 1008 or other option to view information for the user's reminder list. Display screen 1600 may include, for example, a list of programs related to a fantasy sports contest in which the user participates that have been scheduled for automatic reminding such as program "Baltimore Game" 1602. Program 1602 may have associated therewith indicator 1604 or any other suitable indicator to indicate that program 1602 is a fantasy-sports related program (e.g., related to the same fantasy sports contest as programs 1402 and 1404 (FIG. 14)). Display screen 1600 may also include a list of programs unrelated to a fantasy sports contest in which the user participates that have been scheduled for automatic reminding such as programs "On the Riviera" 1606 and "Talkback Live" 1608.

The interactive television program guide application may display reminders for programs of display screen 1600 in, for example, an overlay, an information display screen (e.g., similar to display screen 1200 (FIG. 12)), or in any other suitable application display screen. FIG. 17 shows an illustrative reminder display screen 1700. In this example, reminder overlay 1702 overlays video for a currently tuned program or a current interactive television program guide application display screen. Referring to FIGS. 16 and 17, the interactive television program guide application may display overlay 1702 to alert the user that program "Baltimore Game" 1602 will be available for viewing, for example, at some future time (e.g., 15 minutes later 1704). Overlay may include various additional information such as information for real-life players that are involved in the reminded program and that have been fictitiously selected to the user's fantasy sports contest team or any other additional information (e.g., the user's standing in the related fantasy sports contest). In this example, overlay 1702 indicates that player "David Segui" 1704 is involved in "Baltimore Game" 1602 and has been selected to the user's fantasy sports contest roster or that player 1704 otherwise affects the user's fantasy sports contest (e.g., player 1704 being the subject of a fantasy sports contest-sponsored trivia question that enhances fantasy sports contest competition). The fantasy sports contest application may remove overlay 1702 from display screen 1700 in response to a user selection of "OK" option 1708.

In some embodiments of the present invention, the interactive television program guide application may schedule programs related to a fantasy sports contest in which the user participates for automatic reminding for the user. The interactive television program guide application may, for example, determine in which one or more fantasy sports contests the user participates, determine which programs are related to those fantasy sports contests, and subsequently schedule those fantasy-sports related programs for reminding. As another example, fantasy sports-related programs may be scheduled for automatic recording by a user on a program by program basis (e.g., scheduling automatic reminding of a program by pressing a button of remote control 818 (FIG. 8) while information for the program is displayed in, for example, an information display screen such as display screen 1200 (FIG. 12)).

In some embodiments of the present invention, the interactive television program guide may determine which programs related to a fantasy sports contest in which the user participates to schedule for reminding based on which of the programs are scheduled for recording or based on any other suitable criteria. For example, the interactive program guide application may schedule for reminding only those fantasy sports-related programs that cannot be recorded (e.g., because the system can record only one program at a time and there is a simultaneously showing fantasy sports-related program having a higher priority). As another example, the interactive television program guide application may schedule fantasy sports-related programs that are only minimally relevant to a user's fantasy sports contest (e.g., programs having associated therewith only one or more real-life players that have been fictitiously selected to the user's fantasy sports contest team roster) for automatic reminding (e.g., whereas more relevant programs are scheduled for automatic recording).

In some embodiments of the present invention, the interactive television program guide application may remove a program from one or more of the user's remind or record list if the program is no longer related to a fantasy sports contest in which the user participates. For example, referring to FIGS. 16-18, the interactive television program guide application may remove program "Baltimore Game" 1602 from the user's reminder list if, for example, the user fictitiously trades real-life player "David Segui" 1706 (who is involved in "Baltimore Game" 1602), the fantasy sports contest to which program 1602 had previously related concludes (e.g., the fantasy sports contest having been a partial-season contest), or any other change occurs that renders program 1602 no longer related to a fantasy sports contest in which the user participates.

Figure 19:
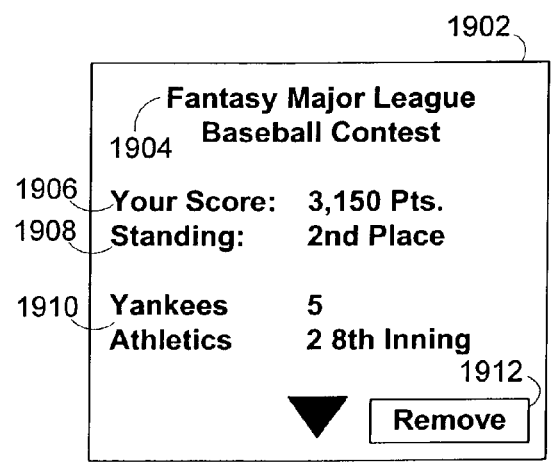
FIG. 19 is an illustrative interactive television program guide fantasy sports contest information overlay display screen in accordance with one embodiment of the present invention.

In some embodiments of the present invention, the interactive television program guide application may display to the user information related to one or more fantasy sports contests in which the user participates. FIG. 19 shows an illustrative fantasy sports contest information display screen 1900. The interactive television program guide application may display display screen 1900 in response to, for example, a user selection of option 1004 (FIG. 10) to view information for fantasy sports contests. In this example, display screen 1900 includes fantasy sports contest information overlay 1902 that overlays video for a currently tuned program or a current interactive television program guide application display screen. In some embodiments of the present invention, the interactive television program guide application may display overlay 1902 in response to, for example, the user selecting an option to tune to a program that is related to a fantasy sports contest in which the user participates (e.g., a fantasy NBA Basketball contestant selects an option to tune to a New York Knicks basketball game). In some embodiments of the present invention, the interactive television program guide may display overlay 1902 at all times when a user accesses the application.

Overlay 1902 may include fantasy sports contest information such as a name of a fantasy sports contest 1904 in which the user participates, the user's fantasy score 1906 for contest 1904, the user's fantasy sports standing 1908 for contest 1904, a boxscore 1910 for one or more programs that are related to contest 1904, and any other suitable fantasy sports contest information (e.g., information for the user's fantasy sports roster selections for contest 1904 or other fantasy sports contest in which the user participates). The interactive television program guide may display fantasy sports contest information in overlay 1902 to allow the user to, for example, navigate through the guide and view television programs without losing track of the user's performance in fantasy sports contest 1904. The interactive television program guide application may remove overlay 1902 from display screen 1900 in response to a user selection of "Remove" option 1912. In other examples, the interactive television program guide application may provide to the user the ability to view fantasy sports contest information (e.g., information for fantasy sports contest trades) in any other suitable display arrangement (e.g., in an information display screen such as display screen 1200 (FIG. 12)) or using any other suitable approach (e.g., displaying a user's fantasy sports contest score using transparent text to minimize obstruction of, for example, a program of interest to the user).

Figure 20:
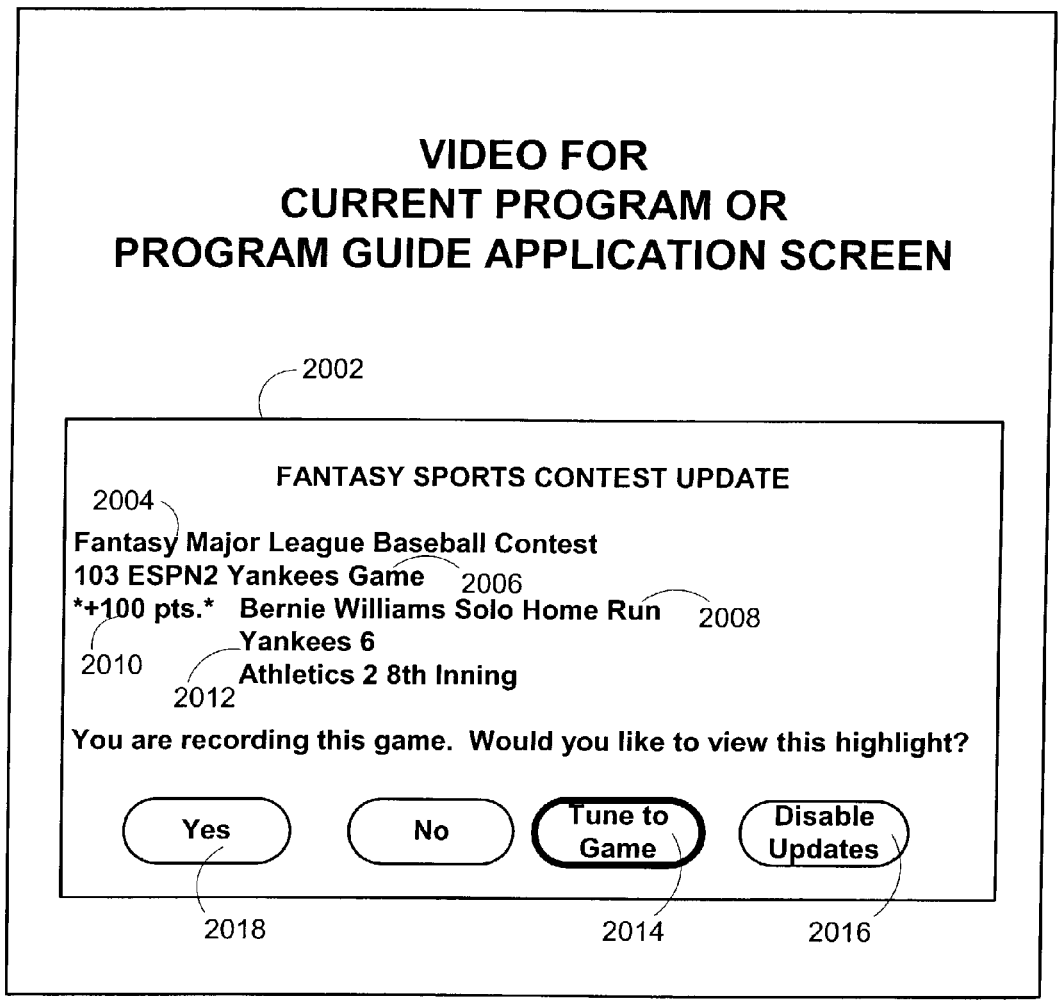
FIG. 20 is an illustrative interactive television program guide application fantasy sports contest update display screen in accordance with one embodiment of the present invention.

In some embodiments of the present invention, the interactive television program guide application may display to the user update information for real-life events related to one or more fantasy sports contests in which the user participates. FIG. 20 shows an illustrative fantasy sports contest update information display screen 2000. The interactive television program guide application may display display screen 2000 in response to, for example, a real-life event occurring that affects the user's standing in one or more of the user's fantasy sports contests. The real-life event may have occurred in, for example, a sports competition (e.g., a baseball game) that is either available or unavailable for viewing by the user (e.g., the sports competition may not be televised and therefore unavailable for viewing, may be a pay-program and therefore available for viewing following a purchase of the program by the user, may be available for viewing in response to a user selection of the appropriate tune channel, etc.). In this example, information for the update may be included in overlay 2002 that overlays video for a currently tuned program or a current interactive television program guide application display screen. Overlay 2002 may include information such as the user's fantasy sports contest 2004 to which the update relates, the channel 2006 on which the fantasy sports-related event occurred (i.e., if the event was televised), a description of the event 2008, a number of fantasy sports contest points 2010 accumulated (e.g., or lost), a boxscore 2012 for a real-life game in which the event occurred, and any other update information, program guide information, or fantasy sports contest information. In embodiments in which the real-life event that affects the user's fantasy sports contest is televised, the interactive television program guide may tune to the channel for that event in response to, for example, a user selection of option 2014. The interactive television program guide application may disable fantasy sports contest updates in response to a user selection of option 2016. The update information of overlay 2002 may be displayed to the user in real time, in a time-delayed fashion (e.g., synchronized with time that the event is scheduled to be televised) or at any other suitable time.

In some embodiments of the present invention, the interactive television program guide may provide to the user the ability to view highlight video clips (e.g., using a personal video recorder) for real-life events related to one or more fantasy sports contests in which the user participates. The highlight video clips may include real-life athletic events (e.g., a real-life baseball player hitting a home run, a real-life football player scoring a touchdown or intercepting a pass, etc.) that may or may not affect the user's standing in a fantasy sports contest. In some embodiments of the present invention, the interactive television program guide application may provide to the user the ability to view highlight video clips for only real-life events that affect the user's standing in a fantasy sports contest.

Figure 21:
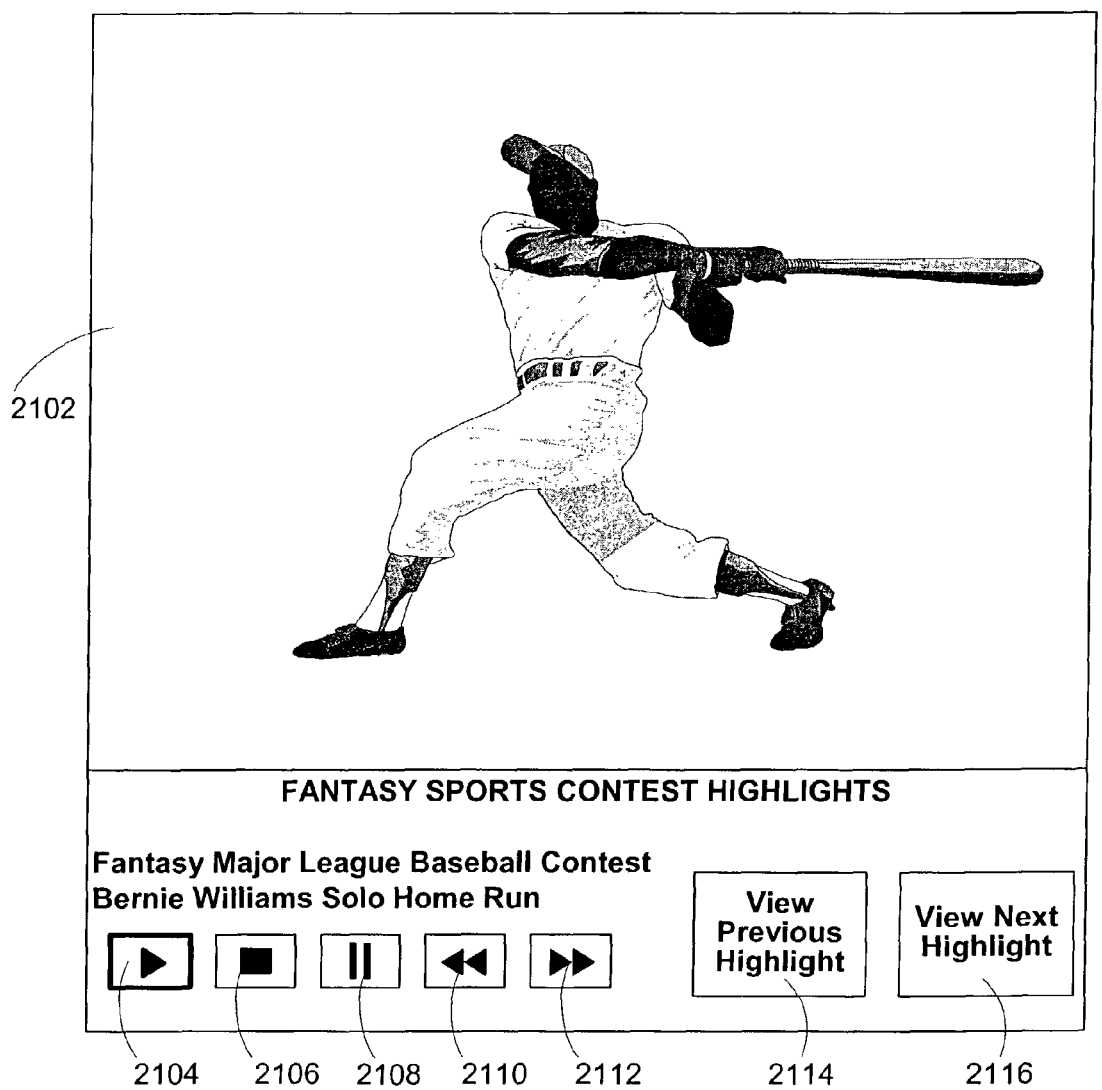
FIG. 21 is an illustrative interactive television program guide application highlight video display screen in accordance with one embodiment of the present invention.

For example, referring to FIGS. 20 and 21, the interactive television program guide application may display display screen 2100 in response to a user selection of option 2018 to view a highlight video clip for real-life event "Bernie Williams Solo Home Run" 2008. Display screen 2100 may include video clip display region 2102 in which video for real-life event 2008 may be displayed. In some embodiments of the present invention, the interactive television program guide application may immediately begin to play the highlight video clip for event 2008 for the user in response to a user selection of option 2018. In other embodiments of the present invention, the interactive television program guide application may initially display the highlight video clip to the user in, for example, a paused state. A user may be permitted to manipulate the video clip by selecting play option 2104, stop option 2106, pause option 2108, rewind option 2110, fast forward option 2112 or other option to manipulate the highlight video clip (e.g., from remote control 818 (FIG. 8). The interactive television program guide may display to a user a previous highlight video clip (e.g., for an event that occurred previously in the game that caused the user to either accumulate or lose fantasy sports contest points, a highlight video clip of another sport for an event that affects the user's standing in a different fantasy sports contest, etc.) in response to a user selection of option 2114. The interactive television program guide may display a highlight video clip for an event that occurred subsequent to the event shown in display region 2102 (e.g., an event that occurred in the real-life game that occurred while the user was viewing the event shown in display region 2102) in response to a user selection of option 2116.

Figure 22:
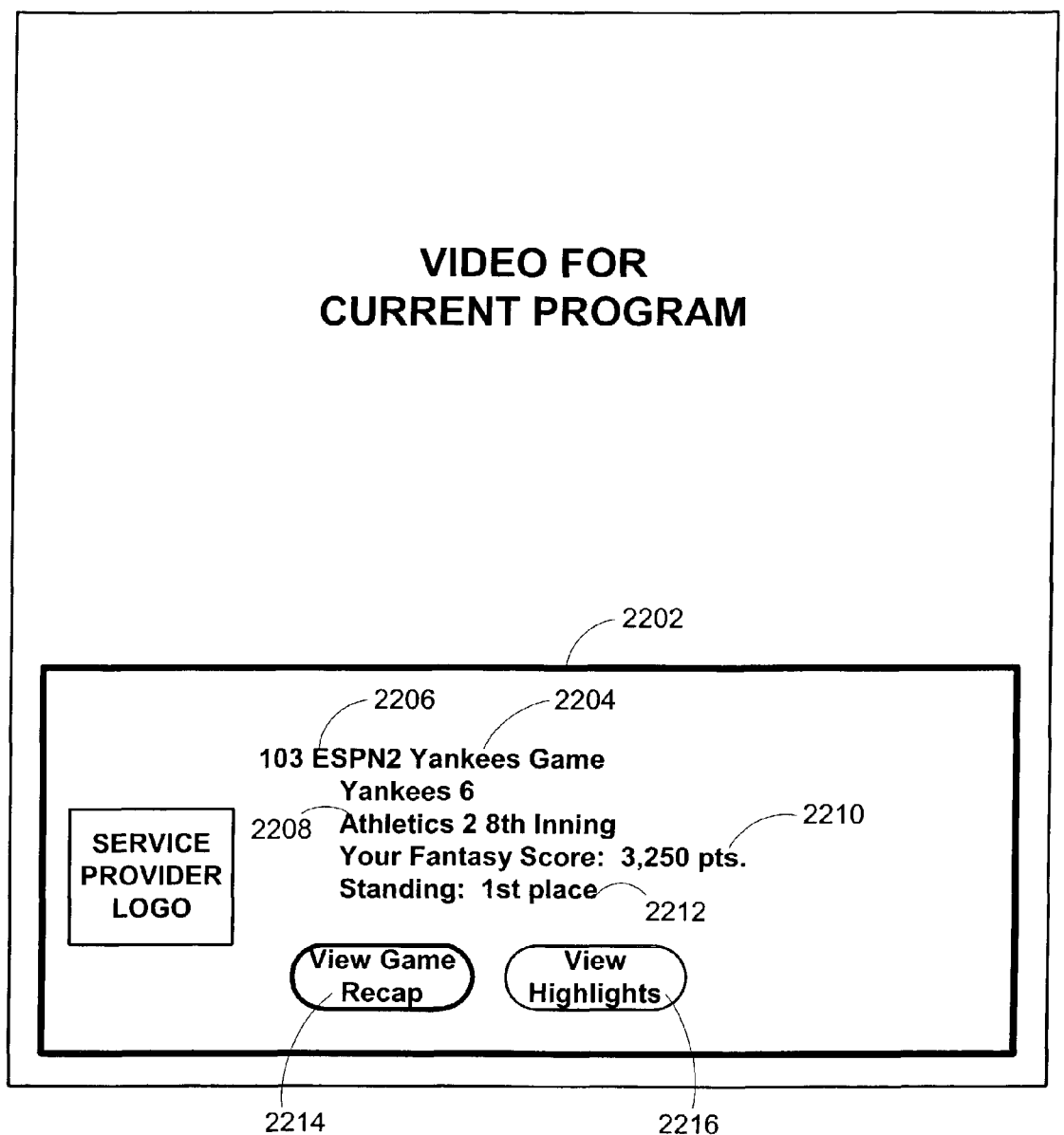
FIG. 22 is an illustrative interactive television program guide application flip display screen in accordance with one embodiment of the present invention.
Figure 23:
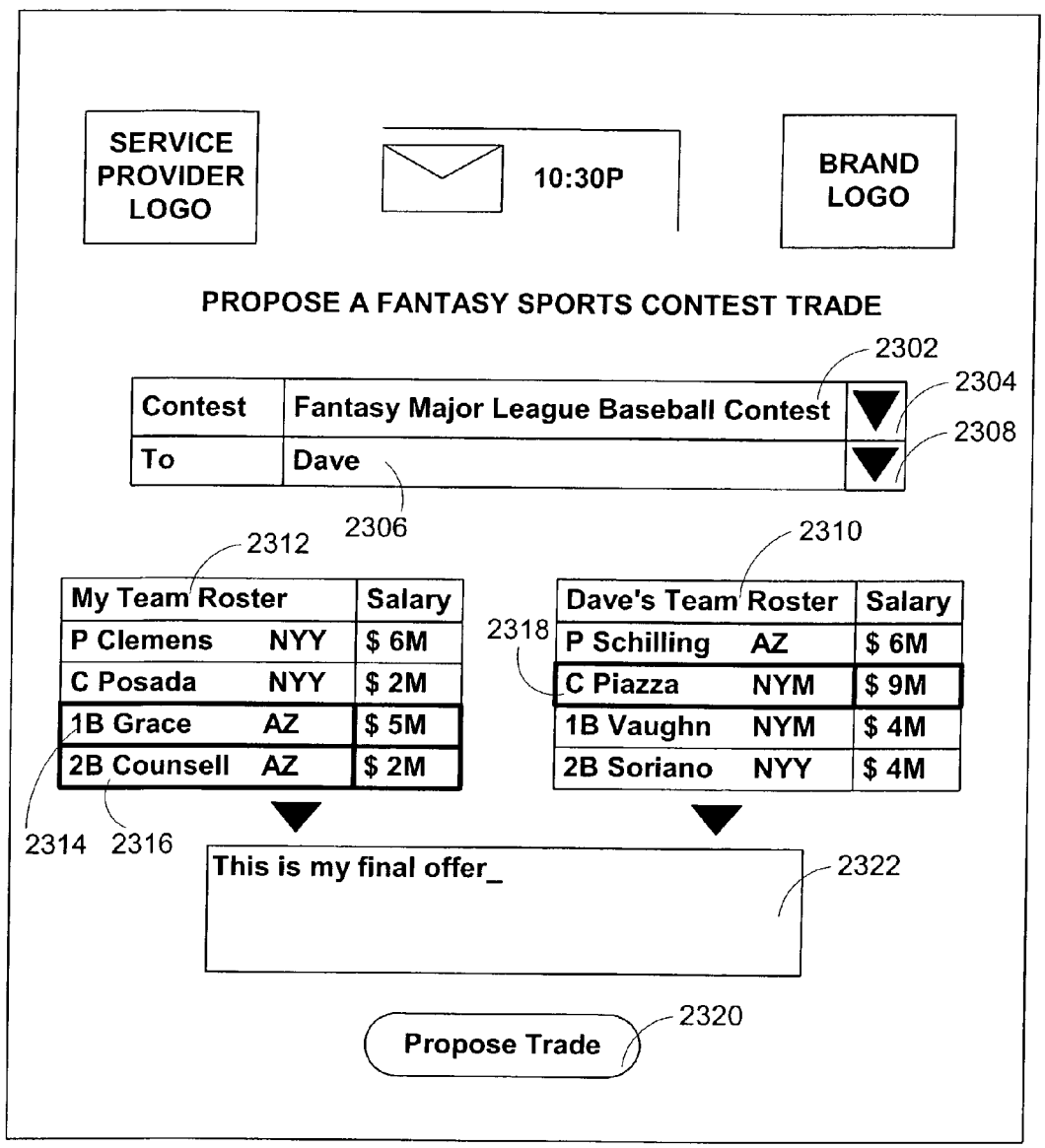
FIG. 23 is an illustrative interactive television program guide application fantasy sports contest trades display screen in accordance with one embodiment of the present invention.

The interactive television program guide application may display program guide and fantasy sports contest information to a user in any suitable display arrangement. FIG. 22 shows an illustrative flip display screen 2200 that includes flip display region 2202. The interactive television program guide application may display display screen 2200 when the user is navigating through television channels (e.g., by pressing "Channel Up" or "Channel Down" buttons on remote control 818 (FIG. 8)). In this example, flip display region 2202 may overlay video for currently tuned program "Yankees Game" 2204 (e.g., which may be the same program as program 1104 (FIGS. 11 and 12).

Flip display region 2202 may include various program guide information such as tuned program 2204, tuned channel 2206, and any other program guide information (e.g., program description). Flip display region may also include various fantasy sports-related program information such as boxscore 2208 for real-life program "Yankees Game" 2204, the user's fantasy sports contest score 2210, the user's standing 2212 in the fantasy sports contest 2212, and any other fantasy sports-related information (e.g., a list of the user's fantasy sports contest team selections that are involved in program 2204). In some embodiments of the present invention, the interactive television program guide application may provide to the user the ability to view a recap (e.g., text summary) of events of, for example, a televised sports event related to a fantasy sports contest in which the user participates. For example, the interactive television program guide application may display information for the events that have occurred in program 2204 (e.g., information such as information 2008 (FIG. 20) in response to a user selection of a suitable option such as option 2214.

The interactive television program guide may also provide to the user the ability to view video highlights for program 2204 (e.g., for events that affect the user's standing in a fantasy sports contest) in response to a user selection of option 2216.

In some embodiments of the present invention, the interactive television program guide application may provide to the user the ability to propose trades of the user's fantasy sports contest roster selections.

Referring to FIGS. 10 and 13, the interactive television program guide application may display display screen 2300 in response to a user selection of option 1012 or other suitable option to access information for fantasy sports contest trades. Display screen 2300 may include various options that allow a user to propose a trade of one or more of the user's fantasy sport contest roster selections for one or more of the roster selections of, for example, another fantasy sports contestant of the same fantasy sports contest league. In this example, the user may be provided with the ability to determine for which of the user's one or more fantasy sports contests 2302 to propose a trade using pull-down menu 2304. The user may also determine to which fantasy sports contestant 2306 of the fantasy sports contest the trade is directed using pull-down menu 2308. In some embodiments of the present invention, the user may be provided with the ability to propose a multiple party trade (e.g., a three way trade between three contestants of the same fantasy sports contest league).

In response to a user selection of contestant "Dave" 2306 using pull-down menu 2308, the interactive television program guide application may display a list of current roster selections 2310 of contestant 2306. A current list of the user's roster selections 2312 may also be displayed (e.g., in response to a user selection of contest 2302). The user may, for example, select fantasy players "Grace" 2314 and "Counsell" 2316 from the user's team roster as the proposed trade for fantasy player "Piazza" 2318 from the roster of contestant 2306. The interactive television program guide may provide data for the trade proposal to contestant 2306 in response to a user selection of option 2320. In some embodiments of the present invention, the interactive television program guide application may deliver (e.g., with or without the trade proposal) a message 2322 from the user to contestant 2306.

Figure 24:
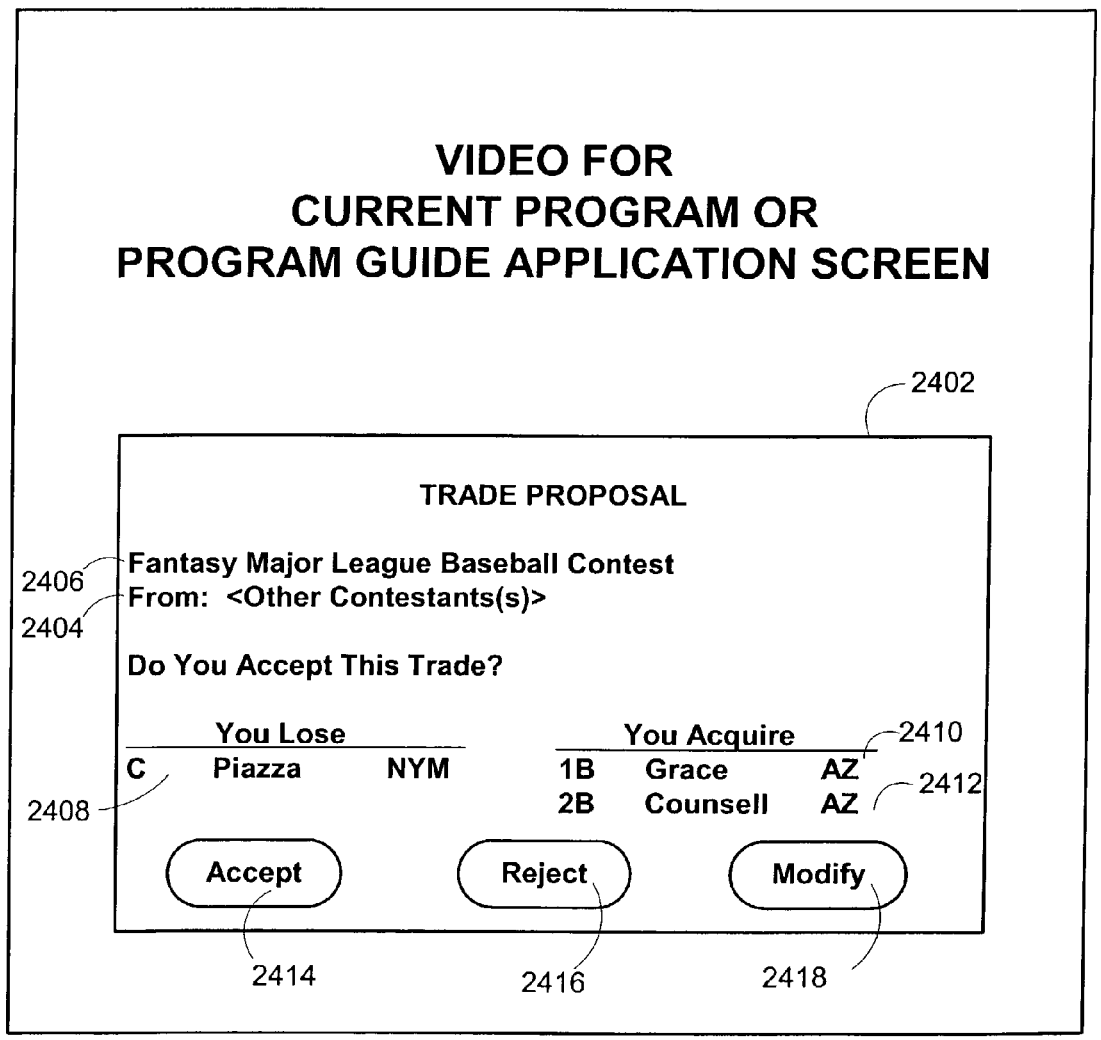
FIG. 24 is an illustrative interactive television program guide application fantasy sports contest trade proposal display screen in accordance with one embodiment of the present invention.

FIG. 24 shows an illustrative received trade proposal display screen 2400. The interactive television program guide application may display display screen 2400 to a user (e.g., contestant "Dave" 2306 (FIG. 23)) in response to another contestant of the user's fantasy sports contest (e.g., contest 2302 (FIG. 23)) proposing a trade to the user. Information for proposed trades may be displayed to a user in any suitable display arrangement. In this example, the trade proposal may be displayed to the user in overlay 2402. Overlay 2402 may include information such as who proposed the trade 2404, the fantasy sports contest to which the trade proposal relates 2406, and any other suitable program guide or fantasy sports contest information. Overlay 2404 may also include information that identifies which fantasy players 2408 the user will lose and which fantasy players (2410, 2412) the user will acquire should the user decide to accept the trade proposal. The interactive television program guide application may accept the trade proposal for the user (i.e., process the changes to the fantasy team rosters of both the user and party 2404) in response to a user selection of option 2414 and may reject the trade proposal for the user in response to a user selection of option 2416. The user may be provided with the ability to modify the trade proposal (e.g., in a display screen similar to display screen 2300 (FIG. 23)) in response to a user selection of option 2418. In response to a user deciding whether to accept the wager, the interactive television program guide application may inform party 2404 of the user's decision.

In some embodiments of the present invention, the interactive television program guide application may provide to the user the ability to determine which of the user's fantasy sports contestants will affect the user's standing in the fantasy sports contest (e.g., for a given week, game, for a portion of the fantasy contest, etc.). FIG. 25 shows an illustrative fantasy roster activation display screen 2500. The interactive television program guide application may display display screen 2500 in response to, for example, a user selection of option 1004 (FIG. 10) or other option to view fantasy sports contest information. In this example, the interactive television program guide application may allow the user to activate fantasy team roster selections for fantasy Major League Baseball contest 2502. The user may, for example, activate fantasy player "Posada" 2504 as the user's catcher 2506 on defense and fantasy player "Piazza" 2508 as the user's catcher on offense (i.e., the user may activate a composite fantasy team catcher comprised of both players 2504 and 2506). For the catcher position 2506, the user's standing in fantasy sports contest 2502 may be affected by only the defensive statistics of player 2504 (e.g., base runners thrown-out, errors, passed balls, etc.) and the offensive statistics of player 2506 (e.g., hits, homeruns, walks, strikeouts, etc.). The interactive television program guide application may display to a user a list of activated fantasy roster selections in response to a user selection of option 2508. Display screen 2500 may include various additional fantasy sports contest information including fantasy sports contest scores 2510, fantasy sports contest standings 2512, or any other fantasy sports contest information (e.g., an option to join a fantasy sports contest).

Figure 26:
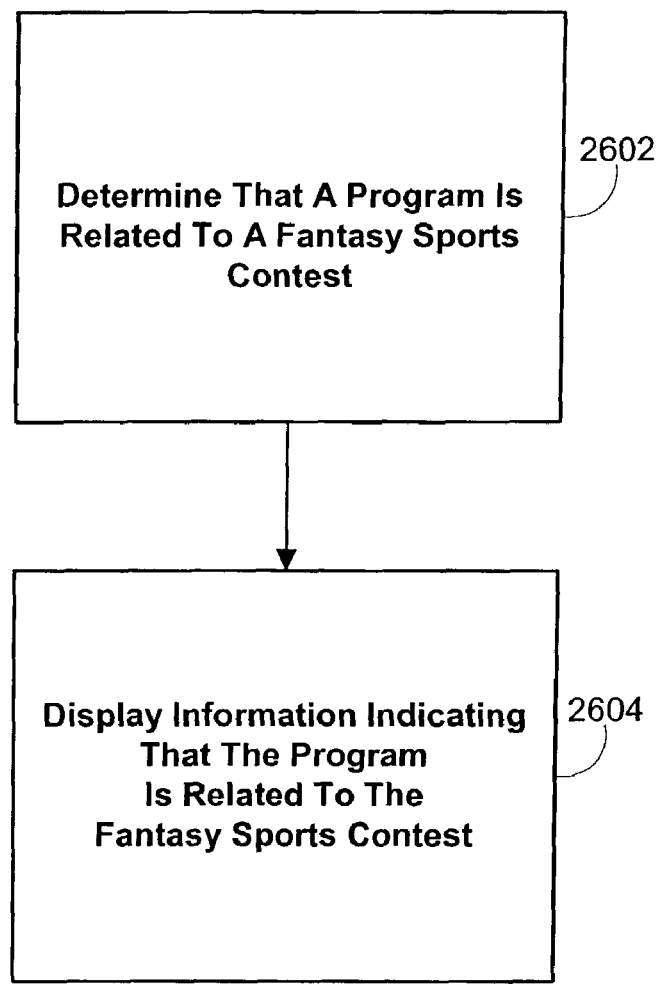
FIGS. 26-27 are flow charts of illustrative steps involved in using an interactive television program guide application to provide fantasy sports contest information to a user.

FIG. 26 is a flow chart of illustrative steps involved in using an interactive television program guide application to provide fantasy sports contest information to a user. At step 2602, the interactive television program guide application may determine that a program (e.g., program 1104 (FIG. 11)) is related to a fantasy sports contest (e.g., in which the user may or may not participate). The interactive television program guide application may, for example, receive data indicating a list of real-life sports players that are included in the program (e.g., involved in a baseball game) from main facility 102 (FIG. 1), distribution facility 202 (FIGS. 2-6), external data service 110 (FIG. 1) Internet service system 302 (FIG. 4), or any other suitable facility or location. The list of players may then be compared with data indicating the user's current fantasy roster selections to determine whether the program is related to a fantasy sports contest of the user. In some embodiments of the present invention, the interactive television program guide application may determine that the program is related to a fantasy sports contest based on, for example, a comparison of the sport to which the program is directed and the sports for which fantasy sports contests are available.

The interactive television program guide application may display information indicating that the program is related to a fantasy sports contest at step 2604. For example, the application may display a program listing that includes a suitable indicator (e.g., program listing 1402 having icon 1406), information for one or more real-life players that are related to the fantasy sports contest and that are included in the program (e.g., names of players 1204 and 1206 (FIG. 12)), or any other suitable information.

Figure 27:
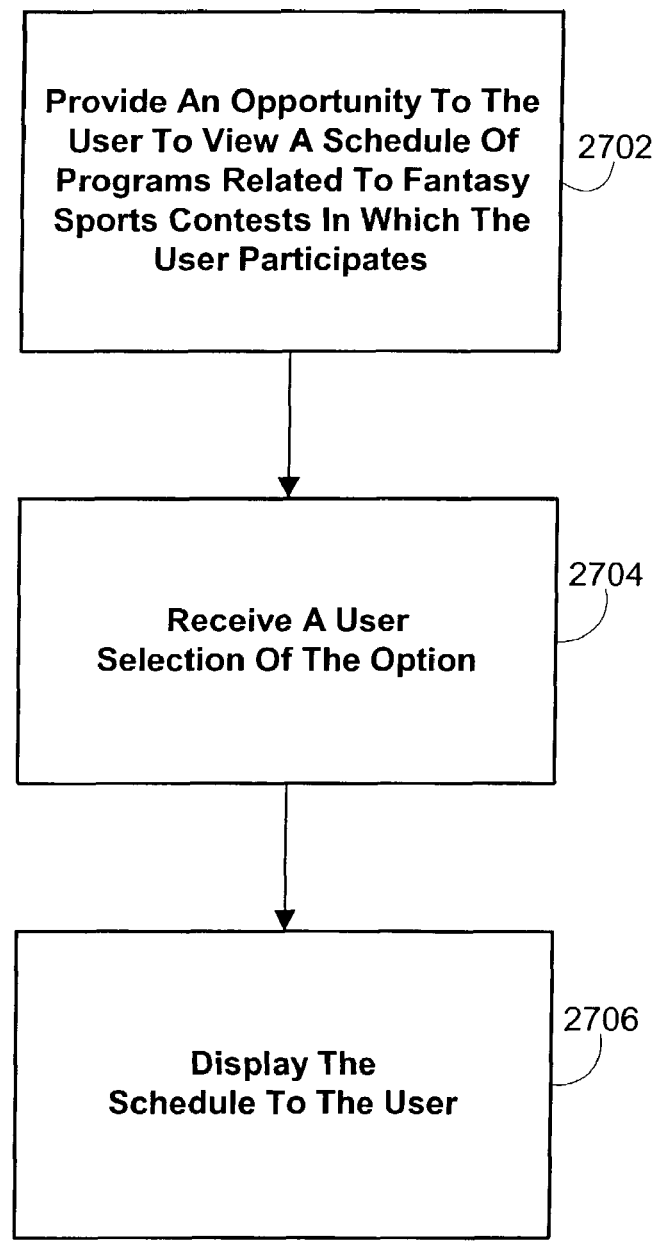

FIG. 27 is another flow chart of illustrative steps involved in using an interactive television program guide application to provide fantasy sports contest information to a user. The interactive television program guide may provide to the user an opportunity to view information for a schedule programs related to fantasy sports contests at step 2702. For example, the application may display option 1010 (FIG. 10) to the user. In response to receiving a user indication of the opportunity at step 2704, the interactive television program guide application may display the schedule to the user at step 2706. For example, a schedule of fantasy sports-related programs that are related to a fantasy sports contest in which the user participates (e.g., currently available programs 1302 and 1304 (FIG. 13)) maybe displayed to the user.

Figure 28:
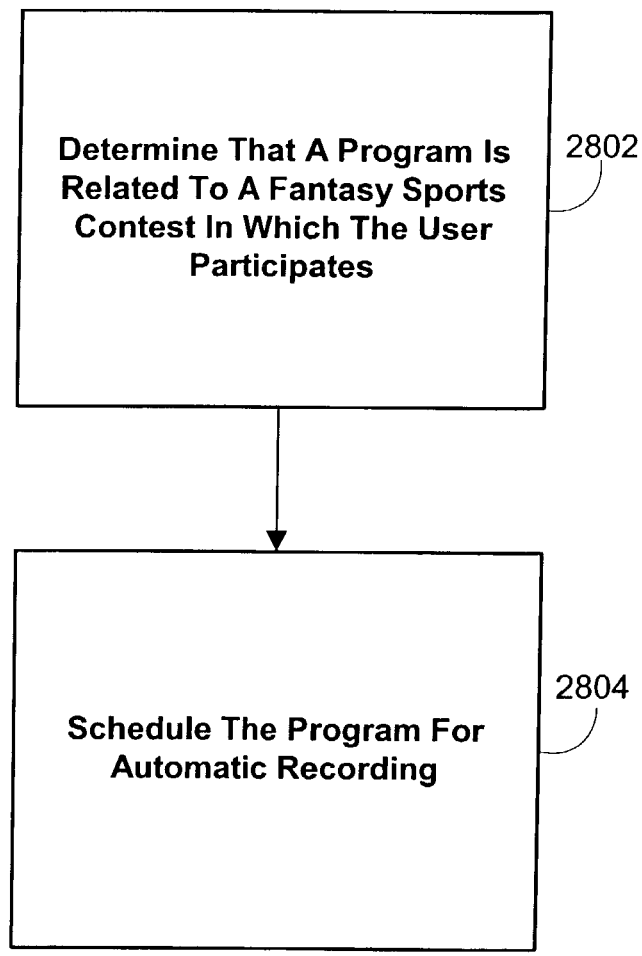
FIGS. 28-30 are flow charts of illustrative steps involved in scheduling a program that is related to a fantasy sports contest in which the user participates for automatic recording.

FIG. 28 is a flow chart of illustrative steps involved in scheduling for automatic recording a program that is related to a fantasy sports contest in which the user participates. At step 2802, the interactive television program guide application may determine that a program is related to the fantasy sports contest (e.g., in a manner similar to that of step 2602 (FIG. 26)). In some embodiments of the present invention, the application may record all programs that are related to a user's fantasy sports contest at step 2804.

Figure 29:
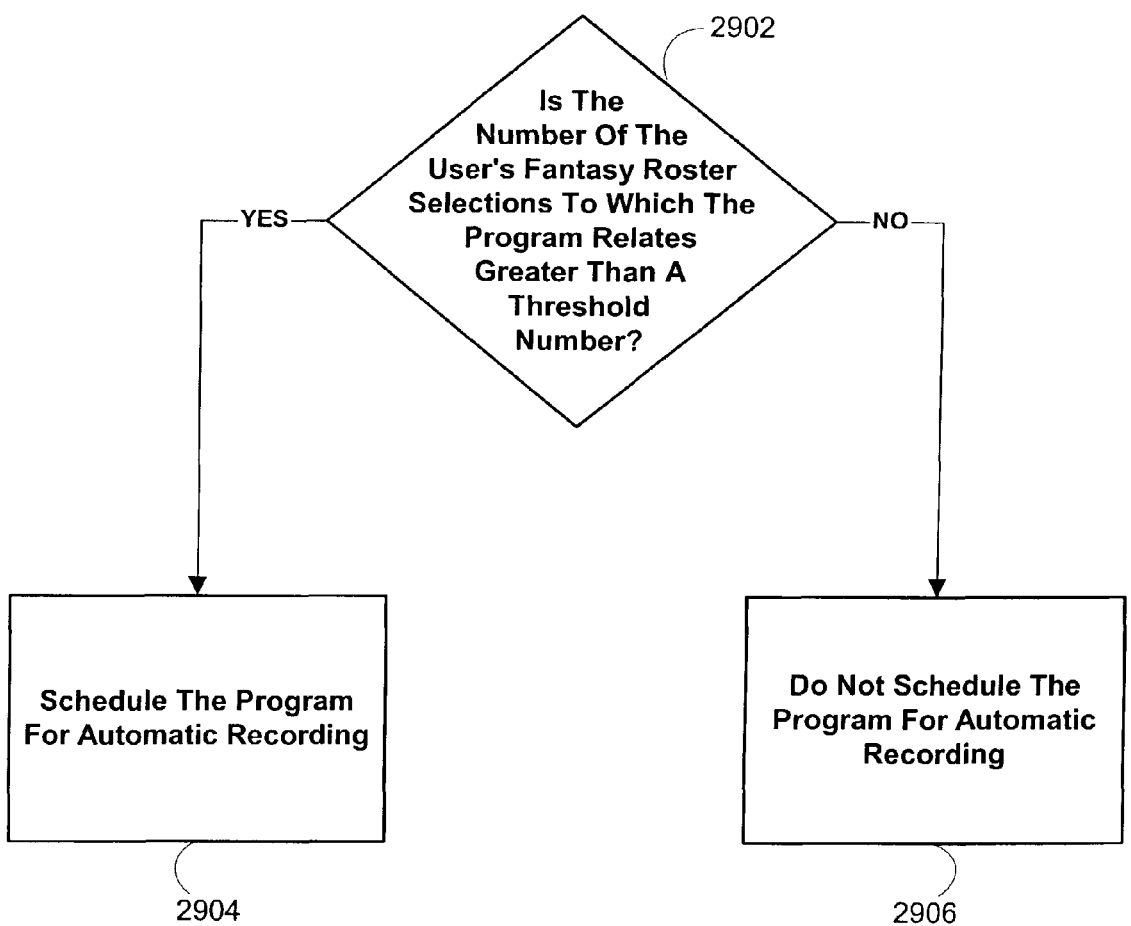

In some embodiments of the present invention, the interactive television program guide application may determine whether to schedule the program for automatic recording for the user based on the relevance of the program to the user's fantasy sports contest. FIG. 29 is a flow chart of illustrative sub-steps involved in step 2804 (FIG. 28). At step 2902, the application may determine whether a number of the user's fantasy roster selections for that fantasy sports contest is higher than a threshold number (e.g., a fixed number such as three, a dynamic number that is determined based on whether there is another program that is related to a user's fantasy sports contest and that is competing to occupy the system's recording resources, a combination thereof, etc.). If the number exceeds the threshold number, the interactive television program guide application may record the program at step 2904. If not, the program may not be recorded at step 2906.

Figure 30:
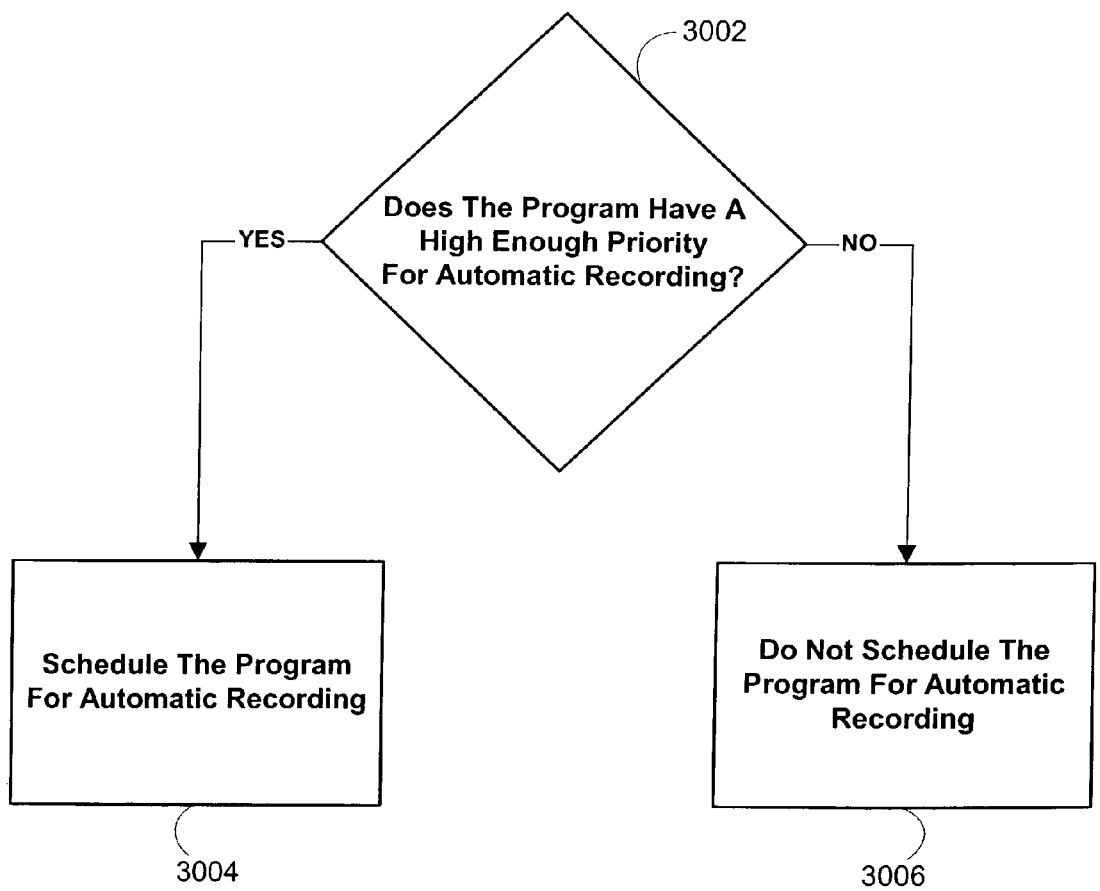

In some embodiments of the present invention, the interactive television program guide application may provide the user with the ability to define a record priority for programs related to a fantasy sports contest in which the user participates (e.g., the record priority shown in display screen 1500 (FIG. 15). FIG. 30 is another flow chart of illustrative sub-steps of step 2804 (FIG. 28). At step 3002, the interactive television program guide application may determine whether a program has a high enough record priority for automatic recording. The application may determine whether the program (e.g., program 1502 (FIG. 15)) has a higher priority than, for example, another program (e.g., program 1504 (FIG. 15)) that is related to the user's fantasy sports contest and that is competing for automatic recording. In response to determining that the program has sufficient priority, the application may schedule the program for automatic recording at step 3004. A program that does not have sufficient record priority may not be recorded at step 3006. In some embodiments of the present invention, the application may schedule such a program for automatic reminding in addition or as an alternative to automatic reminding.

Figure 31:
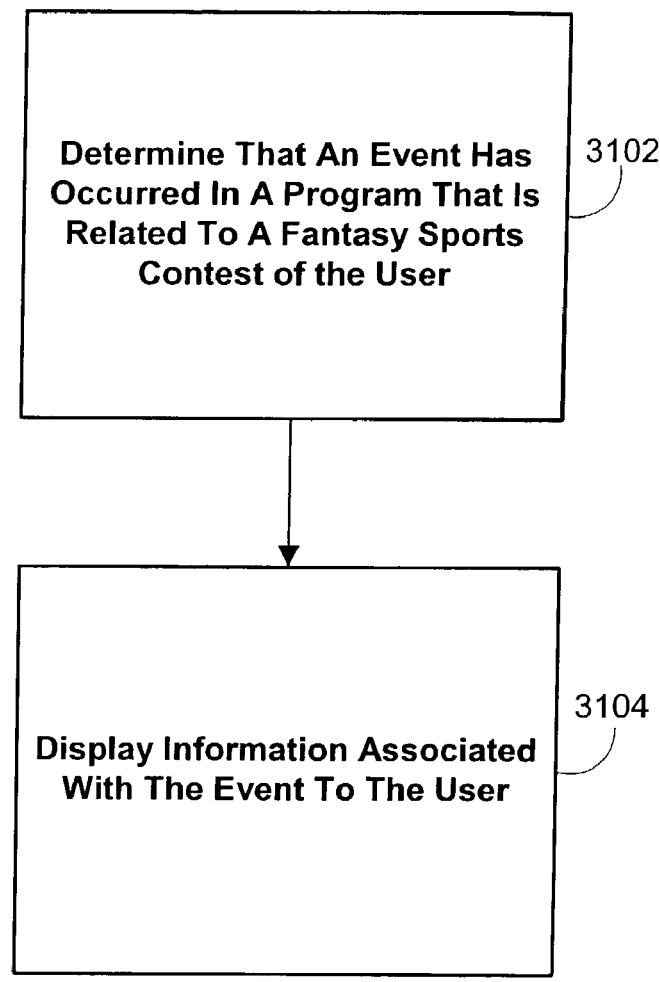
FIG. 31 is a flow chart of illustrative steps involved in providing to a user information for events that affect the user's standing in a fantasy sports contest.

FIG. 31 is a flow chart of illustrative steps involved in providing to a user information for events that affect the user's standing in a fantasy sports contest. At step 3102, the interactive television program guide application may determine that an event has occurred in a program that is related to fantasy sports contest in which the user participates. For example, the application may determine that an event that affects the user's performance in a fantasy sports contest has occurred (e.g., event 2008 (FIG. 20) causing the user to be awarded fantasy sport points 2010). The application may receive data for the event from a suitable source of information such as main facility 102 (FIG. 1), external data source (110), the Internet 302 (FIG. 3), or any other suitable one or more sources of data. The interactive television program guide application may display information for the event to the user at step 3104. For example, the user may display to the user the information shown in fantasy sports contest update overlay display screen 2002 (FIG. 20) or other suitable information for the event.

Figure 32:
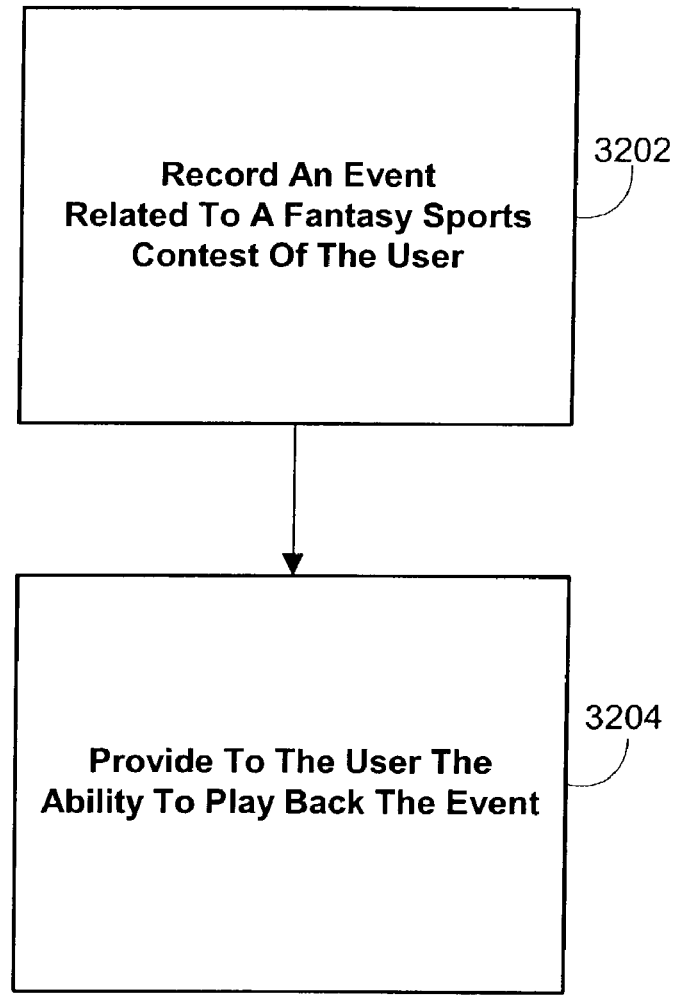
FIG. 32 is a flow chart of illustrative steps involved in displaying to a user a highlight video for an event that is related to a fantasy sports contest in which the user participates.

FIG. 32 is a flow chart of illustrative steps involved in displaying to a user a highlight video for an event that is related to a fantasy sports contest in which the user participates. At step 3202, the interactive television program guide application may direct a suitable storage device (e.g., secondary storage device (808, 908), digital storage device (820, 906), a storage device at server 502 (FIG. 5), etc.) to record an event related to a fantasy sports contest of the user. For example, the application may instruct a suitable recording device to record event "Bernie Williams Solo Home Run" 2008 (FIG. 20) using a personal video recorder (PVR). At step 3204, the application may provide to the user the ability to play back the event (e.g., using controls 2104, 2106, 2108, 2110, and 2112 (FIG. 21)). For example, in response to a user selection of option 2018 (FIG. 20), the interactive television program guide application may display video for the event in display region 2102 (FIG. 21). The application may use, for example, a stored indication of a start of the event to play back the video. Such an indication may be stored by user television equipment 204 (FIGS. 2-8) in a table, may be received by user equipment 204 from, for example, server 502 (FIG. 5), may be inserted by user equipment 204 as a flagged identifier into a digital video stream when the stream is routed to a suitable storage device, or may be otherwise processed using any other suitable approach. In some embodiments of the present invention, a suitable storage device may record programs related to a fantasy sports contest in whcih the user participates in their entirety or in part (e.g., storing only the data for highlights, storing storing all data initially and discarding data for other than highlights after receiving an indication of starts and ends of highlights, etc.).

Thus it is seen that systems and methods for using an interactive television program guide application to access fantasy sports contests are provided. Persons skilled in the art will appreciate that the present invention can be practiced by other than the described embodiments, which are presented for purposes of illustration rather than of limitation, and the present invention is limited only by the claims that follow.

What is claimed is:

1. A method for using an interactive television program guide application to provide fantasy sports contest information to a user, the method comprising:
   receiving a user selection of a real-life sports player associated a real-life sports team in a fantasy sports contest in which the user participates;
   adding the real-life sports player to a user's fantasy team roster;
   determining with the interactive television program guide application that a program includes the real-life sports player by comparing program data associated with the program with the real-life sports player included in the user's fantasy team roster; and
   displaying, in response to determining that the program includes the real-life sports player, information indicating to the user that the program is related to the fantasy sports contest.

2. The method of claim 1 wherein determining that the program includes the real-life sports player comprises determining that the program relates to a real-life competition in which the real-life sports player participates.

3. The method of claim 1 wherein determining that the program includes the real-life sports player comprises determining that the program includes the real-life sports player on the user's fantasy team roster in the fantasy sports contest.

4. The method of claim 1 wherein displaying information comprises displaying information for the real-life sports player included in the program.

5. The method of claim 1 wherein displaying information comprises displaying a program listing that includes an indicator, wherein the indicator indicates that the program is related to the fantasy sports contest.

6. The method of claim 5 wherein the indicator is selected from the group consisting of an icon, text, a graphic, a color, and any combination thereof.

7. The method of claim 5 further comprising:
   receiving a user indication of the program listing; and
   displaying to the user information for the real-life sports player included in the program.

8. The method of claim 5 further comprising:
   receiving a user indication of the program listing; and
   displaying to the user information that indicates the user's performance in the fantasy sports contest.

9. A method for using an interactive television program guide application to provide fantasy sports contest information to a user, the method comprising:
   receiving a user selection of a real-life sports player associated a real-life sports team in a fantasy sports contest in which the user participates;
   adding the real-life sports player to a user's fantasy team roster;
   determining which programs include the real-life sports player by comparing program data associated with the program with the real-life sports player included in the user's fantasy team roster;
   providing to the user an opportunity to view a schedule of the programs that include the real-life sports player; and
   displaying the schedule to the user in response to a user indication of the opportunity.

10. The method of claim 9 wherein the programs relate to events that affect the performance of the user in the fantasy sports contest.

11. A method for using an interactive television program guide application to provide fantasy sports contest information to a user, the method comprising:
   receiving a user selection of a real-life sports player associated a real-life sports team in a fantasy sports contest in which the user participates;
   adding the real-life sports player to a user's fantasy team roster;
   determining with the interactive television program guide application that a program includes the real-life sports player by comparing program data associated with the program with the real-life sports player included in the user's fantasy team roster; and
   scheduling the program for automatic recording for the user.

12. The method of claim 11 wherein determining that the program includes the real-life sports player comprises determining that the program includes the real-life sports player that has been fictitiously added to the fantasy team roster of the user.

13. The method of claim 11 wherein determining that the program includes the real-life sports player comprises determining that the program relates to a real-life competition that affects the fantasy sports contest.

14. The method of claim 11 wherein scheduling the program for automatic recording comprises:
   determining a number of real-life sports players included in the program, each of the real-life sports players a fictitious selection to the fantasy team roster of the user; and
   determining whether to schedule the program for automatic recording based on the number.

15. The method of claim 11 further comprising:
  providing to the user the ability to define a record priority for programs related to the fantasy sports contest; and
  determining whether to schedule the program for automatic recording based on the user-defined record priority.

16. A method for using an interactive television program guide application to provide fantasy sports contest information to a user, the method comprising:
  receiving user selections associated with the fantasy sports contest in which the user participates;
  displaying an unobstructed view of a program;
  determining that the program is related to a fantasy sports contest in which the user participates by comparing program data associated with the program to the user selections associated with the fantasy sports contest in which the user participates;
  determining with the interactive television program guide application that an event has occurred in the program if it is determined that the program is related to the fantasy sports contest in which the user participates; and
  displaying, in response to the determination that the event has occurred, an overlay on top of the program, wherein the overlay includes fantasy sports contest information associated with the event.

17. The method of claim 16 wherein the program includes a real-life player that affects the user's standing in the fantasy sports contest.

18. The method of claim 17
  wherein the event corresponds to an accumulation of a statistic by the real-life player, wherein the statistic affects the user's performance in the fantasy sports contest.

19. The method of claim 17 wherein displaying information associated with the event comprises displaying information that indicates a number of fantasy sports points that the user has received as a result of the event.

20. The method of claim 16 further comprising:
  recording the event using a personal video recorder; and
  providing to the user the ability to play back the event from the personal video recorder.

21. The method of claim 20 wherein recording the event comprises storing data that indicates a start of the event.

22. A method for using an interactive television program guide application to provide fantasy sports contest information to a user, the method comprising:
  receiving a user selection of a real-life sports player associated a real-life sports team in a fantasy sports contest in which the user participates;
  adding the real-life sports player to a user's fantasy team roster;
  providing to the user the ability to select a program for viewing;
  determining that the program includes the real-life sports player by comparing program data associated with the program with the real-life sports player included in the user's fantasy team roster; and
  displaying, in response to user selection of the program and in response to determining that the program includes the real-life sports player, fantasy sports contest information associated with the real-life sports player in conjunction with video for the program.

23. The method of claim 22 wherein the program includes the real-life sports player that affects the fantasy sports contest.

24. The method of claim 22 wherein the program relates to a real-life competition that affects the fantasy sports contest.

25. The method of claim 22 wherein displaying fantasy sports contest information comprises displaying information that indicates a performance of the user in the fantasy sports contest.

26. The method of claim 22, wherein the player is fictitiously added to the fantasy team roster of the user.

27. A method for using an interactive television program guide application to provide fantasy sports contest information to a user, the method comprising:
  receiving a user selection of a real-life sports player associated a real-life sports team in a fantasy sports contest in which the user participates;
  adding the real-life sports player to a user's fantasy team roster;
  displaying a plurality of program guide listings;
  determining that one of the displayed plurality of program guide listings includes the real-life sports player by comparing program data associated with the one of the displayed plurality of program guide listings with the real-life sports player included in the fantasy sports roster;
  displaying, in response to determining that the one of the displayed plurality of program guide listings includes the real life sports player, fantasy sports contest information associated with the real-life sports player.

28. The method of claim 27 wherein displaying information comprises displaying an advertisement for the fantasy sports contest.

29. The method of claim 27 wherein displaying information comprises displaying an advertisement for a fantasy sports contest when the fantasy sports contest is consistent with a maintained viewing history of a user.

30. An interactive television program guide application system operative to provide fantasy sports contest information to a user, the system comprising:
  a display device; and
  control circuitry configured to:
    receive a user selection of a real-life sports player associated a real-life sports team in a fantasy sports contest in which the user participates;
    add the real-life sports player to a user's fantasy team roster;
    determine that a program includes the real-life sports player by comparing program data associated with the program with the real-life sports player included in the user's fantasy team roster; and
    direct the display device to display, in response to determining that the program includes the real-life sports player, information indicating to the user that the program is related to the fantasy sports contest.

31. The system of claim 30 wherein the control circuitry is further configured to determine that the program relates to a real-life competition in which the real-life sports player participates.

32. The system of claim 30 wherein the control circuitry is further configured to determine that the program includes the real-life sports player on the user's fantasy team roster in the fantasy sports contest in which the user participates.

33. The system of claim 30 wherein the control circuitry is further configured to direct the display device to display information for the real-life sports player included in the program.

34. The system of claim 30 wherein the control circuitry is further configured to direct the display device to display a program listing that includes an indicator, wherein the indicator indicates that the program is related to the fantasy sports contest.

35. The system of claim 34 wherein the indicator is selected from the group consisting of an icon, text, a graphic, a color, and any combination thereof.

36. The system of claim 34 wherein the control circuitry is further configured to:
receive a user indication of the program listing; and
direct the display device to display to the user information for the real-life player included in the program.

37. The system of claim 34 wherein the control circuitry is further configured to:
receive a user indication of the program listing; and
direct the display device to display to the user information that indicates the user's performance in the fantasy sports contest.

38. An interactive television program guide application system operative to provide fantasy sports contest information to a user, the system comprising:
a display device;
a user input device; and
control circuitry configured to:
receive a user selection of a real-life sports player associated a real-life sports team in a fantasy sports contest in which the user participates;
add the real-life sports player to a user's fantasy team roster;
determine which programs include the real-life sports player by comparing program data associated with the program with the real-life sports player included in the user's fantasy team roster;
provide to the user an opportunity to view a schedule of the programs that include the real-life sports player that has been selected in the fantasy sports contest in which the user participates;
receive from the user input device a user indication of the opportunity; and
direct a display device to display the schedule to the user.

39. The system of claim 38
wherein the programs relate to events that affect the performance of the user in the fantasy sports contest.

40. An interactive television program guide application system operative to provide fantasy sports contest information to a user, the system comprising:
control circuitry configured to:
receive a user selection of a real-life sports player associated a real-life sports team in a fantasy sports contest in which the user participates;
add the real-life sports player to a user's fantasy team roster;
determine that a program includes the real-life sports player by comparing program data associated with the program with the real-life sports player included in the user's fantasy team roster; and
schedule the program for automatic recording for the user.

41. The system of claim 40 wherein the control circuitry is further configured to determine that the program includes the real-life sports player that has been fictitiously added to the fantasy team roster of the user.

42. The system of claim 40 wherein the control circuitry is further configured to determine that the program relates to a real-life competition that affects the fantasy sports contest.

43. The system of claim 40 wherein the control circuitry is further configured to:
determine a number of real-life sports players included in the program, each of the real-life sports players a fictitious selection to the fantasy team roster of the user; and
determine whether to schedule the program for automatic recording based on the number.

44. The system of claim 40 wherein the control circuitry is further configured to:
provide to the user the ability to define a record priority for programs related to the fantasy sports contest; and
determine whether to schedule the program for automatic recording based on the user-defined record priority.

45. An interactive television program guide application system operative to provide fantasy sports contest information to a user, the system comprising:
a display device; and
control circuitry configured to:
receive user selections associated with a fantasy sports contest in which the user participates;
display an unobstructed view of a program;
determine that the program is related to the fantasy sports contest in which the user participates by comparing program data associated with the program to the user selections associated with the fantasy sports contest in which the user participates;
determine that an event has occurred in the program if it is determined that the program is related to the fantasy sports contest in which the user participates; and
direct the display device to display, in response to the determination that the event has occurred, an overlay on top of the program, wherein the overlay includes fantasy sports contest information associated with the event.

46. The system of claim 45 wherein the program includes the real-life player that affects the user's standing in the fantasy sports contest.

47. The system of claim 46 wherein the event corresponds to an accumulation of a statistic by the real-life player, wherein the statistic affects the user's performance in the fantasy sports contest.

48. The system of claim 45 wherein the control circuitry is further configured to direct the display device to display information that indicates a number of fantasy sports points that the user has received as a result of the event.

49. The system of claim 45 further comprising a memory device, wherein:
the control circuitry is further configured to:
direct the memory device to record the event; and
provide to the user the ability to play back the event from the memory device.

50. The system of claim 49 wherein the control circuitry is further configured to direct the memory device to store data that indicates a start of the event.

51. An interactive television program guide application system operative to provide fantasy sports contest information to a user, the system comprising:
a display device;
a user input device; and
control circuitry configured to:
receive a user selection of a real-life sports player associated a real-life sports team in a fantasy sports contest in which the user participates;
add the real-life sports player to a user's fantasy team roster;
provide to the user the ability to select a program for viewing;
determine that the program includes the real-life sports player by comparing program data associated with the program with the real-life sports player included in the user's fantasy team roster; and
direct the display device to display, in response to user selection of the program and in response to determining that the program includes the real-life sports player, fantasy sports contest information associated with the real-life sports player in conjunction with video for the program.

52. The system of claim 51 wherein the program includes the real-life sports player that affects the fantasy sports contest.

53. The system of claim 51 wherein the program relates to a real-life competition that affects the fantasy sports contest.

54. The system of claim 51 wherein the control circuitry is further configured to direct the display device to display fantasy sports contest information that indicates a performance of the user in the fantasy sports contest.

55. The system of claim 51 wherein the player is fictitiously added to the fantasy team roster of the user.

56. An interactive television program guide application system operative to provide fantasy sports contest information to a user, the system comprising:
   a display device;
   a user input device; and
   control circuitry configured to:
      receive a user selection of a real-life sports player associated a real-life sports team in a fantasy sports contest in which the user participates;
      add the real-life sports player to a user's fantasy team roster;
      display a plurality of program guide listings;
      determine that one of the displayed plurality of program guide listings includes the real-life sports player by comparing program data associated with the one of the displayed plurality of program guide listings with the real-life sports player included in the fantasy sports roster; and
      direct a display device to display, in response to determining that the one of the displayed plurality of program guide listings includes the real life sports player, fantasy sports contest information associated with the real-life sports player.

57. The system of claim 56 wherein the control circuitry is further configured to direct the display device to display an advertisement for the fantasy sports contest.

58. The system of claim 56 wherein the control circuitry is further configured to direct the display device to displaying an advertisement for a fantasy sports contest when the fantasy sports contest is consistent with a maintained viewing history of a user.

59. An interactive television program guide application operative to provide fantasy sports contest information to a user, the system comprising:
   means for receiving a user selection of a real-life sports player associated a real-life sports team in a fantasy sports contest in which the user participates;
   means for adding the real-life sports player to a user's fantasy team roster;
   means for determining with the interactive television program guide application that a program includes the real-life sports player by comparing program data associated with the program with the real-life sports player included in the user's fantasy team roster; and
   means for displaying, in response to determining that the program includes the real-life sports player, information indicating to the user that the program is related to the fantasy sports contest.

60. The system of claim 59 wherein the means for determining that the program includes the real-life sports player comprises means for determining that the program relates to a real-life competition in which the real-life sports player participates.

61. The system of claim 59 wherein the means for determining that the program includes the real-life sports player comprises means for determining that the program includes the real-life sports player on the user's fantasy team roster in the fantasy sports contest in which the user participates.

62. The system of claim 59 wherein the means for displaying information comprises means for displaying information indicating the real-life sports player is included in the program.

63. The system of claim 59 wherein the means for displaying information comprises means for displaying a program listing that includes an indicator, wherein the indicator indicates that the program is related to the fantasy sports contest.

64. The system of claim 63 wherein the indicator is selected from the group consisting of an icon, text, a graphic, a color, and any combination thereof.

65. The system of claim 63 further comprising:
   means for receiving a user indication of the program listing; and
   means for displaying to the user information for the real-life player included in the program.

66. The system of claim 63 further comprising:
   means for receiving a user indication of the program listing; and
   means for displaying to the user information that indicates the user's performance in the fantasy sports contest.

67. An interactive television program guide application system operative to provide fantasy sports contest information to a user, the system comprising:
   means for receiving a user selection of a real-life sports player associated a real-life sports team in a fantasy sports contest in which the user participates;
   means for adding the real-life sports player to a user's fantasy team roster;
   means for determining which programs include the real-life sports player by comparing program data associated with the program with the real-life sports player included in the user's fantasy team roster;
   means for providing to the user an opportunity to view a schedule of the programs that include the real-life sports player that has been selected in the fantasy sports contest in which the user participates; and
   means for displaying the schedule to the user in response to a user indication of the opportunity.

68. The system of claim 67 wherein the programs relate to events that affect the performance of the user in the fantasy sports contest.

69. An interactive television program guide application system operative to provide fantasy sports contest information to a user, the system comprising:
   means for receiving a user selection of a real-life sports player associated a real-life sports team in a fantasy sports contest in which the user participates;
   means for adding the real-life sports player to a user's fantasy team roster;
   means for determining with the interactive television program guide application that a program includes real-life sports player by comparing program data associated with the program with the real-life sports player included in the user's fantasy team roster; and
   means for scheduling the program for automatic recording for the user.

70. The system of claim 69 wherein the means for determining that the program includes the real-life sports player comprises means for determining that the program includes the real-life sports player that has been fictitiously added to the fantasy team roster of the user.

71. The system of claim 69 wherein the means for determining that the program includes the real-life sports player comprises means for determining that the program relates to a real-life competition that affects the fantasy sports contest.

72. The system of claim 69 wherein the means for scheduling the program for automatic recording comprises:
means for determining a number of real-life sports players included in the program, each of the real-life sports players a fictitious selection to the fantasy team roster of the user; and
means for determining whether to schedule the program for automatic recording based on the number.

73. The system of claim 69 further comprising:
means for providing to the user the ability to define a record priority for programs related to the fantasy sports contest; and
means for determining whether to schedule the program for automatic recording based on the user-defined record priority.

74. An interactive television program guide application system operative to provide fantasy sports contest information to a user, the system comprising:
means for receiving user selections associated with a fantasy sports contest in which the user participates;
means for displaying an unobstructed view of a program;
means for determining that the program is related to the fantasy sports contest in which the user participates by comparing program data associated with the program to the user selections associated with the fantasy sports contest in which the user participates;
means for determining with the interactive television program guide application that an event has occurred in the program if it is determined that the program is related to the fantasy sports contest in which the user participates; and
means for displaying, in response to the determination that the event has occurred, an overlay on top of the program, wherein the overlay includes fantasy sports contest information associated with the event.

75. The system of claim 74 wherein the program includes the real-life player that affects the user's standing in the fantasy sports contest.

76. The system of claim 75 wherein the event corresponds to an accumulation of a statistic by the real-life player, wherein the statistic affects the user's performance in the fantasy sports contest.

77. The system of claim 74 wherein the means for displaying information associated with the event comprises means for displaying information that indicates a number of fantasy sports points that the user has received as a result of the event.

78. The system of claim 74 further comprising:
means for recording the event using a personal video recorder; and
means for providing to the user the ability to play back the event from the personal video recorder.

79. The system of claim 78 wherein the means for recording the event comprises means for storing data that indicates a start of the event.

80. An interactive television program guide application system operative to provide fantasy sports contest information to a user, the system comprising:
means for receiving a user selection of a real-life sports player associated a real-life sports team in a fantasy sports contest in which the user participates;
means for adding the real-life sports player to a user's fantasy team roster;
means for providing to the user the ability to select a program for viewing;
means for determining that the program includes the real-life sports player by comparing program data associated with the program with the real-life sports player included in the user's fantasy team roster; and
means for displaying, in response to user selection of the program and in response to determining that the program includes the real-life sports player, fantasy sports contest information associated with the real-life sports player in conjunction with video for the program.

81. The system of claim 80 wherein the program includes the real-life sports player that affects the fantasy sports contest.

82. The system of claim 80 wherein the program relates to a real-life competition that affects the fantasy sports contest.

83. The system of claim 80 wherein the means for displaying fantasy sports contest information comprises means for displaying information that indicates a performance of the user in the fantasy sports contest.

84. The system of claim 80 wherein the player is fictitiously added to the fantasy team roster of the user.

85. An interactive television program guide application system operative to provide fantasy sports contest information to a user, the system comprising:
means for receiving a user selection of a real-life sports player associated a real-life sports team in a fantasy sports contest in which the user participates;
means for adding the real-life sports player to a user's fantasy team roster;
means for displaying a plurality of program guide listings;
means for determining that one of the displayed plurality of program guide listings includes the real-life sports player by comparing program data associated with the one of the displayed plurality of program guide listings with the real-life sports player included in the fantasy sports roster; and
means for displaying, in response to determining that the one of the displayed plurality of program guide listings includes the real life sports player, fantasy sports contest information associated with the real-life sports player.

86. The system of claim 85 wherein the means for displaying information comprises means for displaying an advertisement for the fantasy sports contest.

87. The system of claim 85 wherein the means for displaying information comprises means for displaying an advertisement for a fantasy sports contest when the fantasy sports contest is consistent with a maintained viewing history of a user.

88. A non-transitory machine-readable medium for an interactive television program guide application, the machine-readable medium having machine program logic recorded thereon for:
receiving a user selection of a real-life sports player associated a real-life sports team in a fantasy sports contest in which the user participates;
adding the real-life sports player to a user's fantasy team roster;
determining with the interactive television program guide application that a program includes the real-life sports player by comparing program data associated with the program with the real-life sports player included in the user's fantasy team roster; and
displaying, in response to determining that the program includes the real-life sports player information indicating to the user that the program is related to the fantasy sports contest.

89. The a non-transitory machine-readable medium of claim 88 wherein determining that the program includes the real-life sports player comprises determining that the program relates to a real-life competition in which the real-life sports player participates.

90. The non-transitory machine-readable medium of claim 88 wherein determining that the program includes the real-life sports player comprises determining that the program includes the real-life sports player on the user's fantasy team roster in the fantasy sports contest in which the user participates.

91. The non-transitory machine-readable medium of claim 88 wherein displaying information comprises displaying information for the real-life sports player included in the program.

92. The machine-readable medium of claim 88 wherein displaying information comprises displaying a program listing that includes an indicator, wherein the indicator indicates that the program is related to the fantasy sports contest.

93. The non-traniomachine-readable medium of claim 92 wherein the indicator is selected from the group consisting of an icon, text, a graphic, a color, and any combination thereof.

94. The non-transitory machine-readable medium of claim 92 further comprising machine program logic recorded thereon for:
receiving a user indication of the program listing; and
displaying to the user information for the real-life player included in the program.

95. The non-transitory machine-readable medium of claim 92 further comprising machine program logic recorded thereon for:
receiving a user indication of the program listing; and
displaying to the user information that indicates the user's performance in the fantasy sports contest.

96. A non-transitory machine-readable medium for an interactive television program guide application, the machine-readable medium having machine program logic recorded thereon for:
receiving a user selection of a real-life sports player associated a real-life sports team in a fantasy sports contest in which the user participates;
adding the real-life sports player to a user's fantasy team roster;
determining which programs include the real-life sports player by comparing program data associated with the program with the real-life sports player included in the user's fantasy team roster;
providing to the user an opportunity to view a schedule of the programs that include the real-life sports player that has been selected in the fantasy sports contest in which the user participates; and
displaying the schedule to the user in response to a user indication of the opportunity.

97. The non-transitory machine-readable medium of claim 96 wherein the programs relate to events that affect the performance of the user in the fantasy sports contest.

98. A non-transitory machine-readable medium for an interactive television program guide application, the machine-readable medium having machine program logic recorded thereon for:
receiving a user selection of a real-life sports player associated a real-life sports team in a fantasy sports contest in which the user participates;
adding the real-life sports player to a user's fantasy team roster;
determining with the interactive television program guide application that a program includes the real-life sports player by comparing program data associated with the program with the real-life sports player included in the user's fantasy team roster; and
scheduling the program for automatic recording for the user.

99. The non-transitory machine-readable medium of claim 98 wherein determining that the program includes the real-life sports player comprises determining that the program includes the real-life sports player that has been fictitiously added to the fantasy team roster of the user.

100. The non-transitory machine-readable medium of claim 98 wherein determining that the program includes the real-life sports player comprises determining that the program relates to a real-life competition that affects the fantasy sports contest.

101. The non-transitory machine-readable medium of claim 98 wherein scheduling the program for automatic recording comprises:
determining a number of real-life sports players included in the program, each of the real-life sports players a fictitious selection to the fantasy team roster of the user; and
determining whether to schedule the program for automatic recording based on the number.

102. The non-transitory machine-readable medium of claim 98 further comprising machine program logic recorded thereon for:
providing to the user the ability to define a record priority for programs related to the fantasy sports contest; and
determining whether to schedule the program for automatic recording based on the user-defined record priority.

103. A non-transitory machine-readable medium for an interactive television program guide application, the machine-readable medium having machine program logic recorded thereon for:
receiving user selections associated with a fantasy sports contest in which the user participates;
displaying an unobstructed view of a program;
determining that the program is related to the fantasy sports contest in which the user participates by comparing program data associated with the program to the user selections associated with the fantasy sports contest in which the user participates;
determining with the interactive television program guide application that an event has occurred in the program if it is determined that the program is related to the fantasy sports contest in which the user participates; and
displaying, in response to the determination that the event has occurred, an overlay on top of the program, wherein the overlay includes fantasy sports contest information associated with the event.

104. The non-transitory machine-readable medium of claim 103 wherein the program includes the real-life player that affects the user's standing in the fantasy sports contest.

105. The non-transitory machine-readable medium of claim 104 wherein the event corresponds to an accumulation of a statistic by the real-life player, wherein the statistic affects the user's performance in the fantasy sports contest.

106. The non-transitory machine-readable medium of claim 103 wherein displaying information associated with the event comprises displaying information that indicates a number of fantasy sports points that the user has received as a result of the event.

107. The non-transitory machine-readable medium of claim 103 further comprising machine program logic recorded thereon for:

recording the event using a personal video recorder; and
providing to the user the ability to play back the event from the personal video recorder.

108. The non-transitory machine-readable medium of claim 107 wherein recording the event comprises storing data that indicates a start of the event.

109. A non-transitory machine-readable medium for an interactive television program guide application, the machine-readable medium having machine program logic recorded thereon for:
receiving a user selection of a real-life sports player associated a real-life sports team in a fantasy sports contest in which the user participates;
adding the real-life sports player to a user's fantasy team roster;
providing to the user the ability to select a program for viewing;
determining that the program includes the real-life sports player by comparing program data associated with the program with the real-life sports player included in the user's fantasy team roster; and
displaying, in response to user selection of the program and in response to determining that the program includes the real-life sports player, fantasy sports contest information associated with the real-life sports player in conjunction with video for the program.

110. The non-transitory machine-readable medium of claim 109 wherein the program includes the real-life sports player that affects the fantasy sports contest.

111. The non-transitory machine-readable medium of claim 109 wherein the program relates to a real-life competition that affects the fantasy sports contest.

112. The non-transitory machine-readable medium of claim 109 wherein displaying fantasy sports contest information comprises displaying information that indicates a performance of the user in the fantasy sports contest.

113. The non-transitory machine-readable medium of claim 109 wherein the player is fictitiously added to the fantasy team roster of the user.

114. A non-transitory machine-readable medium for an interactive television program guide application, the machine-readable medium having machine program logic recorded thereon for:
receiving a user selection of a real-life sports player associated a real-life sports team in a fantasy sports contest in which the user participates;
adding the real-life sports player to a user's fantasy team roster;
displaying a plurality of program guide listings;
determining that one of the displayed plurality of program guide listings includes the real-life sports player by comparing program data associated with the one of the displayed plurality of program guide listings with the real-life sports player included in the fantasy sports roster; and
displaying, in response to determining that the one of the displayed plurality of program guide listings includes the real life sports player, fantasy sports contest information associated with the real-life sports player.

115. The non-transitory machine-readable medium of claim 114 wherein displaying information comprises displaying an advertisement for the fantasy sports contest.

116. The non-transitory machine-readable medium of claim 114 wherein displaying information comprises displaying an advertisement for a fantasy sports contest when the fantasy sports contest is consistent with a maintained viewing history of a user.

\* \* \* \* \*

UNITED STATES PATENT AND TRADEMARK OFFICE
CERTIFICATE OF CORRECTION

PATENT NO. : 8,028,315 B1
APPLICATION NO. : 10/234727
DATED : September 27, 2011
INVENTOR(S) : David Barber It is certified that error appears in the above-identified patent and that said Letters Patent is hereby corrected as shown below:

In the Claims:

at column 29, claim number 1, line number 44, please insert --with-- after "associated" and before "a real-life sports";

at column 30, claim number 9, line number 21, please insert --with-- after "associated" and before "a real-life sports";

at column 30, claim number 11, line number 40, please insert --with-- after "associated" and before "a real-life sports";

at column 31, claim number 22, line number 48, please insert --with-- after "associated" and before "a real-life sports";

at column 32, claim number 27, line number 11, please insert --with-- after "associated" and before "a real-life sports";

at column 32, claim number 30, line number 39, please insert --with-- after "associated" and before "a real-life sports";

at column 33, claim number 38, line number 22, please insert --with-- after "associated" and before "a real-life sports";

at column 33, claim number 40, line number 44, please insert --with-- after "associated" and before "a real-life sports";

at column 34, claim number 51, line number 55, please insert --with-- after "associated" and before "a real-life sports";

at column 35, claim number 56, line number 22, please insert --with-- after "associated" and before "a real-life sports";

at column 35, claim number 59, line number 50, please insert --with-- after "associated" and before "a real-life sports";

Signed and Sealed this
Eleventh Day of September, 2012

David J. Kappos
*Director of the United States Patent and Trademark Office* at column 36, claim number 67, line number 31, please insert --with-- after "associated" and before "a real-life sports";

at column 36, claim number 69, line number 52, please insert --with-- after "associated" and before "a real-life sports";

at column 36, claim number 69, line number 57, please insert --the-- after "includes" and before "real-life sports";

at column 37, claim number 80, line number 64, please insert --with-- after "associated" and before "a real-life sports";

at column 38, claim number 85, line number 27, please insert --with-- after "associated" and before "a real-life sports";

at column 38, claim number 88, line number 55, please insert --with-- after "associated" and before "a real-life sports";

at column 39, claim number 89, line number 1, please remove "a" after "The" and before "non-transitory";

at column 39, claim number 92, line number 16, please insert --non-transitory-- after "The" and before "machine-readable medium";

at column 39, claim number 93, line number 20, replace "non-traniomachine-readable" with "non-transitory machine-readable";

at column 39, claim number 96, line number 40, please insert --with-- after "associated" and before "a real-life sports";

at column 39, claim number 98, line number 62, please insert --with-- after "associated" and before "a real-life sports";

at column 41, claim number 109, line number 12, please insert --with-- after "associated" and before "a real-life sports"; and at column 42, claim number 114, line number 11, please insert --with-- after "associated" and before "a real-life sports."